United States Patent
Aratsu et al.

(10) Patent No.: US 10,482,661 B2
(45) Date of Patent: Nov. 19, 2019

(54) DISPLAYING OF AUGMENTED REALITY OBJECTS

(71) Applicant: International Business Machines Corporation, Armonk, NY (US)

(72) Inventors: Taku Aratsu, Tokyo (JP); Toshiyuki Komoda, Tokyo (JP); Yohei Umehara, Kawasaki (JP); Satoshi Yokoyama, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/057,592

(22) Filed: Mar. 1, 2016

(65) Prior Publication Data

US 2017/0256094 A1 Sep. 7, 2017

(51) Int. Cl.
*G06T 19/00* (2011.01)

(52) U.S. Cl.
CPC .................. *G06T 19/006* (2013.01)

(58) Field of Classification Search
CPC .................................................. G06T 19/006
See application file for complete search history.

(56) References Cited

U.S. PATENT DOCUMENTS

| | | | |
|---|---|---|---|
| 8,687,021 B2 | 4/2014 | Bathiche et al. | |
| 9,049,469 B2 | 6/2015 | Melzer | |
| 2010/0001993 A1* | 1/2010 | Finn | A63F 13/12 345/419 |
| 2012/0256954 A1* | 10/2012 | Soon-Shiong | G06F 17/3087 345/633 |

(Continued)

FOREIGN PATENT DOCUMENTS

| | | |
|---|---|---|
| JP | 2012104106 A | 5/2012 |
| JP | 2014517566 A | 7/2014 |
| WO | 2012121055 A1 | 9/2012 |

OTHER PUBLICATIONS

Ishiguro et al., "Peripheral Vision Annotation: Noninterference Information Presentation Method for Mobile Augmented Reality," Augmented Human '11, Mar. 12-14, 2011, Tokyo, Japan, © 2010 ACM 1-58113-000-0/00/0010, 4 pgs., http://dl.acm.org/citation.cfm?id=1959834.

(Continued)

*Primary Examiner* — Edward Martello
(74) *Attorney, Agent, or Firm* — Kristofer L. Haggerty

(57) ABSTRACT

An embodiment of the present invention provides a computer-implemented method for displaying one or more augmented reality (AR) objects on a transparent display device, comprising: associating data of one or more transparent areas corresponding to one or more real objects with a first layer for seeing one or more real objects on the transparent display device, wherein the data has information on a location and shape of the one or more real objects on the transparent display device, associating one or more AR objects with a second layer for displaying one or more AR objects on the transparent display device; and overlaying the first layer with the second layer to display the one or more AR objects on the transparent display device, wherein the one or more real objects are seen through the one or more transparent areas on the transparent display device by transparent area the transparent display device.

17 Claims, 24 Drawing Sheets

(56) References Cited

U.S. PATENT DOCUMENTS

| | | | |
|---|---|---|---|
| 2012/0293548 A1 | 11/2012 | Perez et al. | |
| 2013/0044128 A1* | 2/2013 | Liu | G09G 5/00 345/633 |
| 2013/0050258 A1* | 2/2013 | Liu | G06F 3/005 345/633 |
| 2013/0136304 A1* | 5/2013 | Anabuki | G06K 9/00362 382/103 |
| 2013/0342572 A1* | 12/2013 | Poulos | G02B 27/017 345/633 |
| 2014/0098137 A1* | 4/2014 | Fein | G06T 11/60 345/633 |
| 2014/0152697 A1 | 6/2014 | Shin | |
| 2014/0240352 A1 | 8/2014 | Kuncl et al. | |
| 2015/0170422 A1* | 6/2015 | Aoyama | G06T 19/006 345/8 |
| 2015/0277556 A1* | 10/2015 | Hayashida | G06F 3/013 382/103 |
| 2015/0279108 A1 | 10/2015 | Border et al. | |

OTHER PUBLICATIONS

Van Krevelen et al., "A Survey of Augmented Reality Technologies, Applications and Limitations," The International Journal of Virtual Reality, 2010, 9(2)1-19, http://kjcomps.6te.net/upload/paper1%20.pdf.

Unknown, "Recomended applications," SmartEyeglass Developer Edition, SED-E1, Applications—Developer World, http://developer.sonymobile/com/products/smarteyeglass/applications/#seg-header, 4 pgs., printed Jan. 26, 2016, 11:22, © Sony Mobile Communications Inc.

Hachman, M. "Sony answers Oculus, Microsoft with new gaming headgear, glasses," http://www.pcworld.com/article/2084923/sony-answers-oculus-microsoft-with-new-gaming-headgear-glasses.html, 6 pgs., printed Feb. 26, 2016 10:46 AM.

Microsoft, "HoloLens," Microsoft HoloLens official site, https://www.microsoft.com/microsoft-hololens/en-us, 10 pgs., printed Feb. 26, 2016 11:06 AM.

Yildirim, A. "Livestreaming App for SmartEyeglass available as open source project," http://developer/sonymobile/com/, 4 pgs., printed Feb. 5, 2016 3:04 PM, © 2016 Sony Mobile Communications, Inc.

Unknown, "Human Sensing Package," ZMP Inc., http://www.zmp.co.jp/products/humansensingpackage?lang=en, 4 pgs., printed Feb. 26, 2016 10:35 AM, © ZMP Inc. 2001-2016.

* cited by examiner

DISPLAYING OF AUGMENTED REALITY OBJECTS

BACKGROUND

The present invention relates to an augmented reality (AR), and more specifically, to displaying one or more AR objects on a transparent display device. AR technology presents information on a user's surrounding environment by overlapping it on the user's real view. In these days, the cases that the AR technology is used in sporting events are increasing. For example, the user can see information on a player during sports watching through a transparent display device, such as a head mount display (HMD), or AR glasses. Further, the AR technology allows a user to see a simple notification service (SNS) message relating event site or guide information at sightseeing site.

SUMMARY

According to one aspect of an embodiment of the present invention, the present invention provides a computer-implemented method for displaying one or more AR objects on a transparent display device. The method comprises the following steps: associating data of one or more transparent areas corresponding to one or more real objects with a first layer for seeing one or more real objects on the transparent display device, wherein the data has information on a location and shape of the one or more real objects on the transparent display device, associating one or more AR objects with a second layer for displaying one or more AR objects on the transparent display device; and overlaying the first layer with the second layer to display the one or more AR objects on the transparent display device, wherein the one or more real objects are seen through the one or more transparent areas on the transparent display device by a user wearing or having the transparent display device.

According to another aspect of an embodiment of the present invention, a computer system comprising a computer readable storage medium storing a program of instructions executable by the computer system to perform one or more methods described herein also may be provided.

According to another aspect of an embodiment of the present invention, a computer program product comprising a computer readable storage medium storing a program of instructions executable by the computer system to perform one or more methods described herein also may be provided.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "an augmented reality", AR, may refer to cases in which an otherwise real environment is "augmented" by means of virtual objects. Augmentation can be achieved with various different techniques known for a person skilled in the art.

The term, "an AR object", may refer to any data which can be displayed on a transparent display device. The AR object comprises one or more AR contents. The AR content may be, for example, but not limited to any information; any virtual data, such as a photograph, an animation or video; an advertisement, or combination of these. The AR object may be 2D, 3D or 4D object.

The term, "a real object", may refer to any objects which exist in the real world. The real object can be observed by a user through a transparent display device.

The term, "a transparent display device", may refer to any device which has a transparent screen, such as an AR display device including a display unit configured to display an augmented reality space in which one or more AR objects are overlapped with a reality space. The transparent display device can display one or more AR objects and allow a user to see real objects through the transparent display. A user can wear any transparent display device, for example, on his head or have any transparent display device which allows a user to see a screen of the transparent display device.

The transparent display device may be, for example, but not limited to, a head mount display (HMD), AR glasses, or a 3D display.

The transparent device can have one or more biological sensors, for example, but not limited to, an eye tracking sensor, an emotion detection sensor, or combination of these.

The term, "transparent area", may refer to an area from which a user can see real objects. A user wearing or having the transparent display device can see a reality space including one or more real objects.

Figure 1:
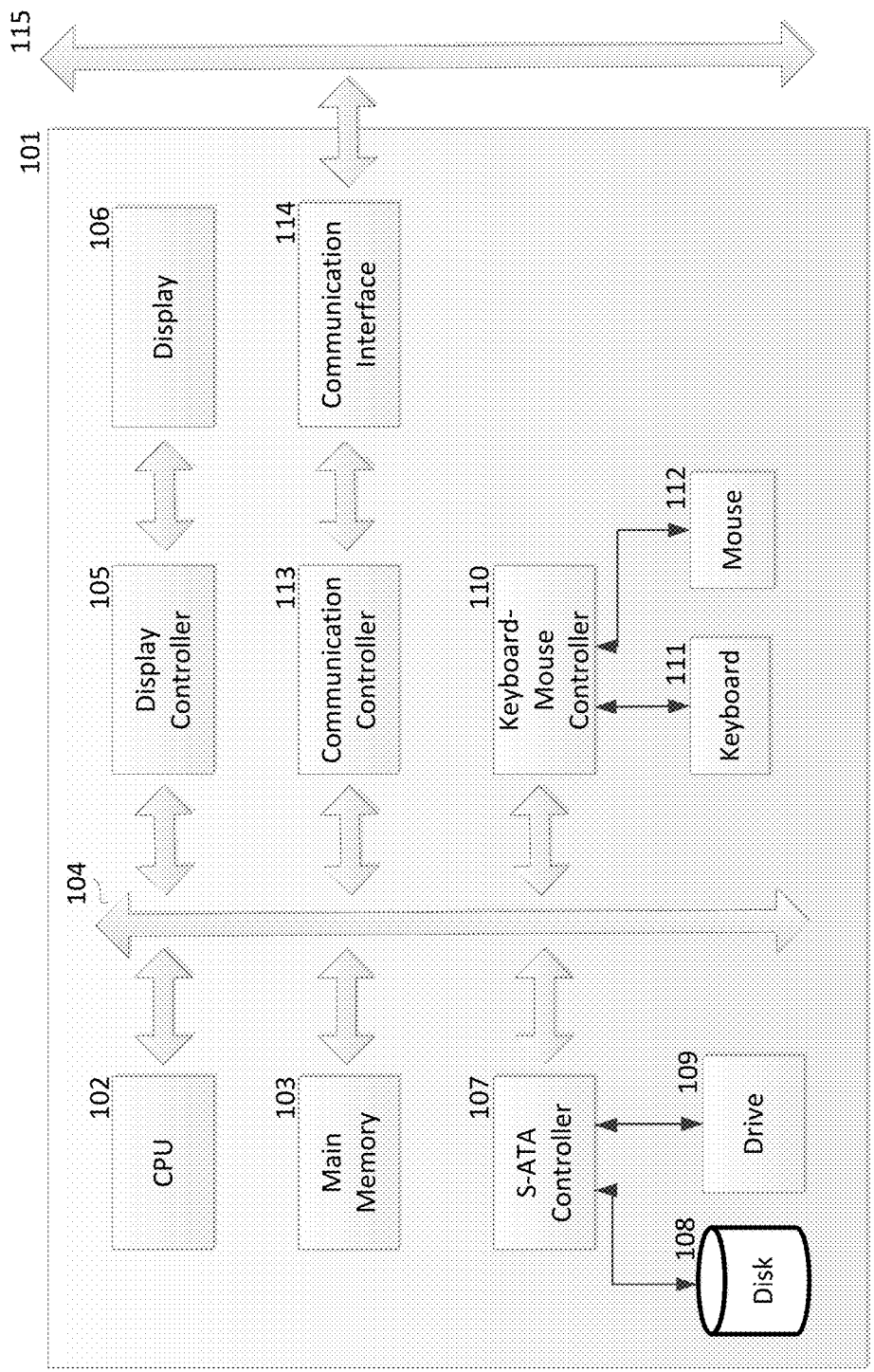
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2A:
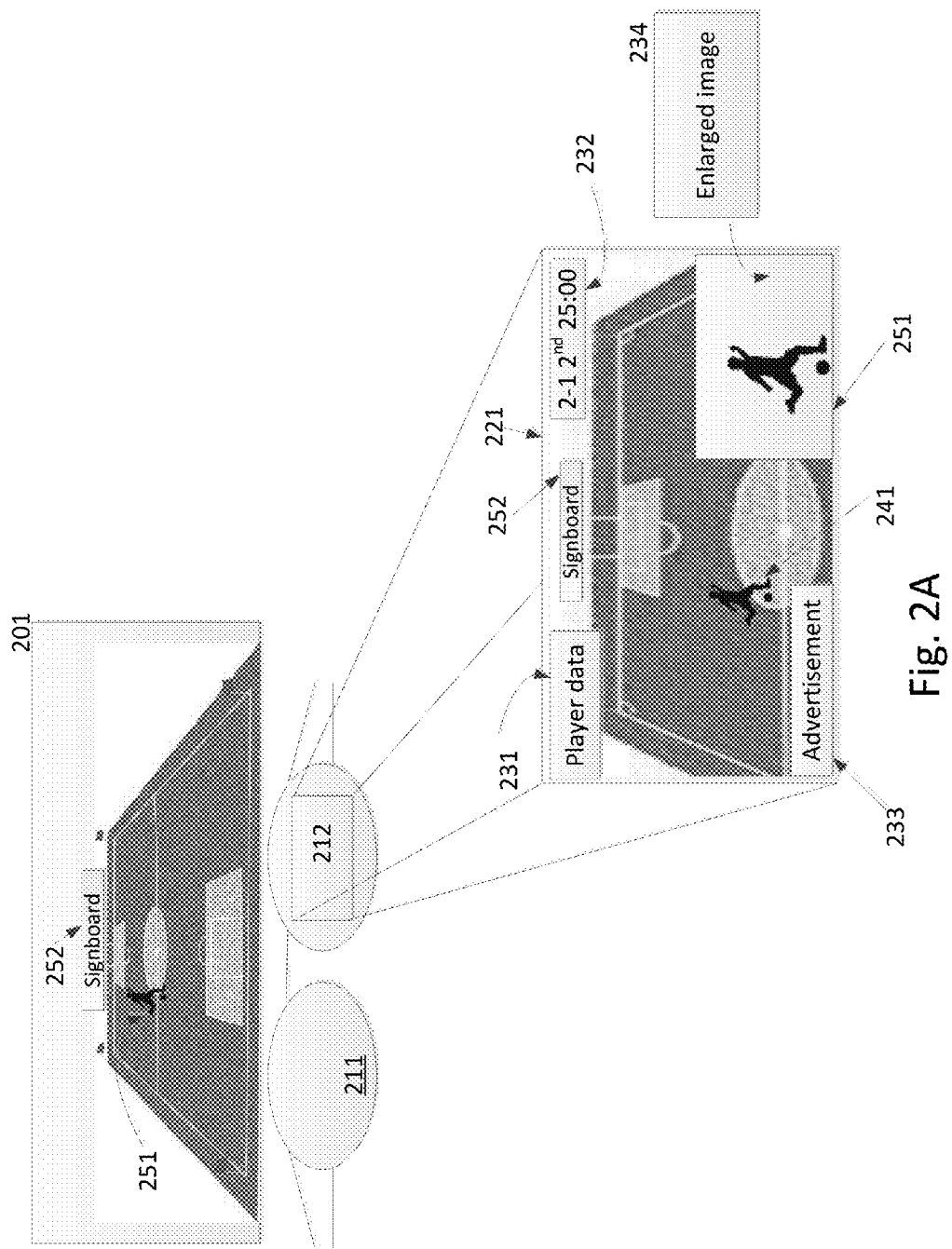
FIG. 2A illustrates a conventional diagram of displaying AR objects on a transparent display device.
Figure 2B:
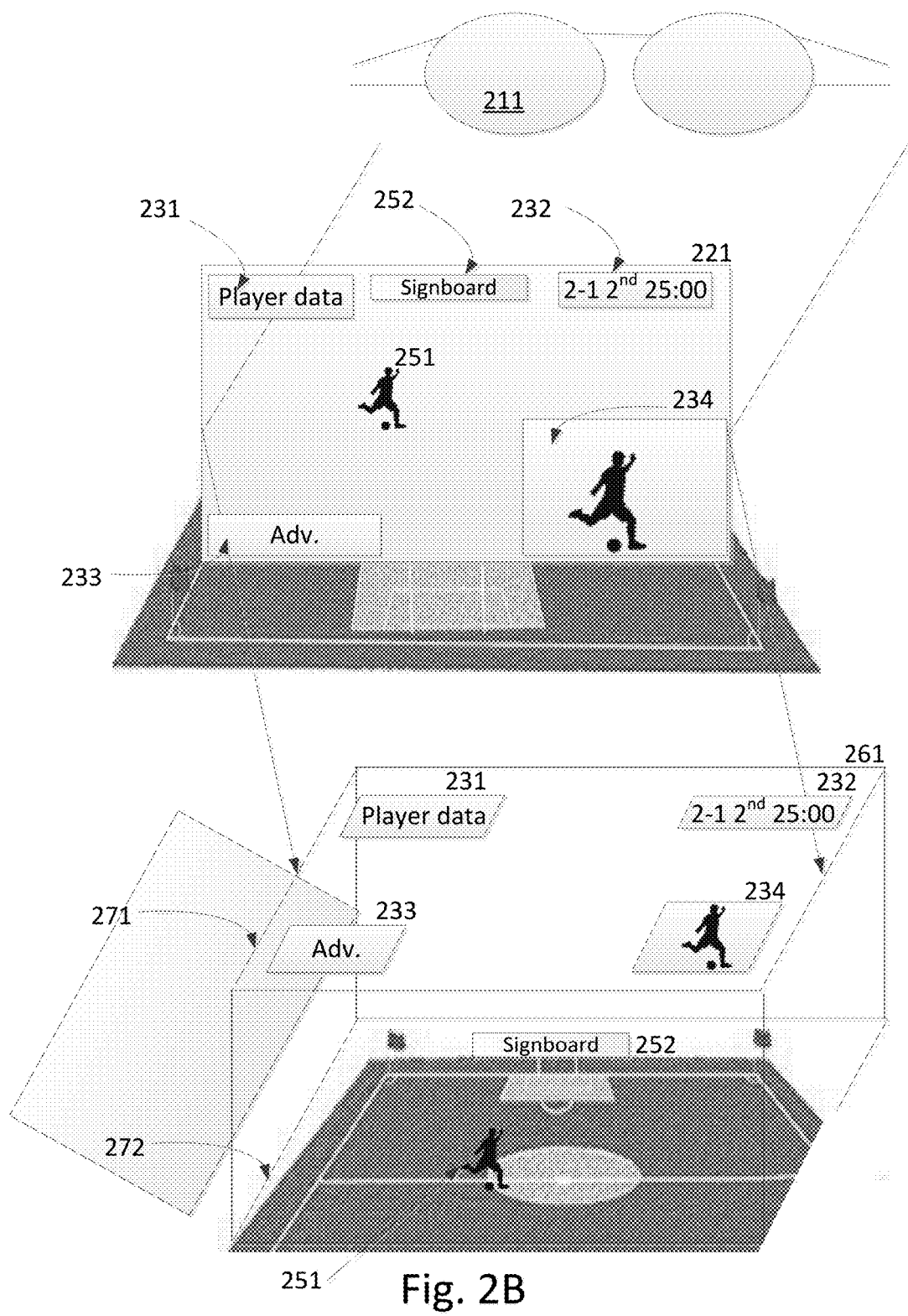
FIG. 2B illustrates a conventional diagram of a physical structure for presenting the AR object.

Prior to explaining an embodiment of the present invention, a conventional manner of displaying AR objects and a physical structure for presenting the AR object are explained referring to FIGS. 2A and 2B.

With reference now to FIG. 2A, FIG. 2A illustrates a conventional manner of displaying AR objects on a transparent display device.

A user is now wearing a HMD (211) as the transparent display device and watching a soccer match in a soccer stadium (201). Many signboards for an advertisement (252) are equipped with the soccer stadium (201). A player (251) is now handling a soccer ball around the center of the field.

The following AR objects are now displayed on the HMD (211): data of a player who is now handling a soccer ball (231), score data and time of the match (232), an advertisement realized by AR technique (233) and an enlarged live video realized by AR technique (234). The player data (231) may be changed when the soccer ball is passed to another player. The score data and time of the match (232) may be updated, according to a result of goal and time of the match. The advertisement (233) may be updated, for example, at a predefined interval time. The enlarged live video may be changed for another player, for example, when the user points out another player by an air click (241) in front of the HMD (211).

As seen in a user view frame (221) which corresponds to an area (212) of the HMD (211), a user can see real live soccer match through the transparent screen (221), except the areas where the AR objects (231, 232, 233 and 234) are displayed.

With reference now to FIG. 2B, FIG. 2B illustrates a conventional manner of a physical structure for presenting the AR object.

The upper part of FIG. 2B describes the HMD (211) and the user view frame (221), both of which are the same as those described in FIG. 2A.

The lower part of FIG. 2B shows that the physical structure (261) of presenting the AR objects (231, 232, 233 and 234) is implemented as an AR drawing layer (271) on which AR objects (231, 232, 233 and 234) are drawn. The user can see real live soccer match (272) through the areas other than the areas where the AR objects are drawn on the AR drawing layer (271).

As apparent from FIGS. 2A and 2B, there is a case that the AR objects interfere with a user's view of the match. Accordingly, there is a need to adjust a display of one or more AR objects.

The information which is overlapped by the user's real view through the transparent display device tends to obscure a user's field of view. Such information impedes a user's view of a real object, for example when a user is watching a game or performing real world activities.

According to one embodiment of the present invention, such information provided through the AR device does not interfere with a user's field of view. Further, according to one embodiment of the present information, such information provided through the AR device can be changed, according to an environment in which user is or user's condition, such as a degree of concentration.

Hereinafter, an embodiment of the present invention will be described with reference to the following FIGS. 3A and 3B, 4A and 4B, 5A and 5B, 6, 7A to 7C, 8A to 8C, 9A to 9E, 10 and 11.

A system such as the computer (101) performs each process described in Figures mentioned above. The system may be implemented as a single computer or plural computers.

Figure 3A:
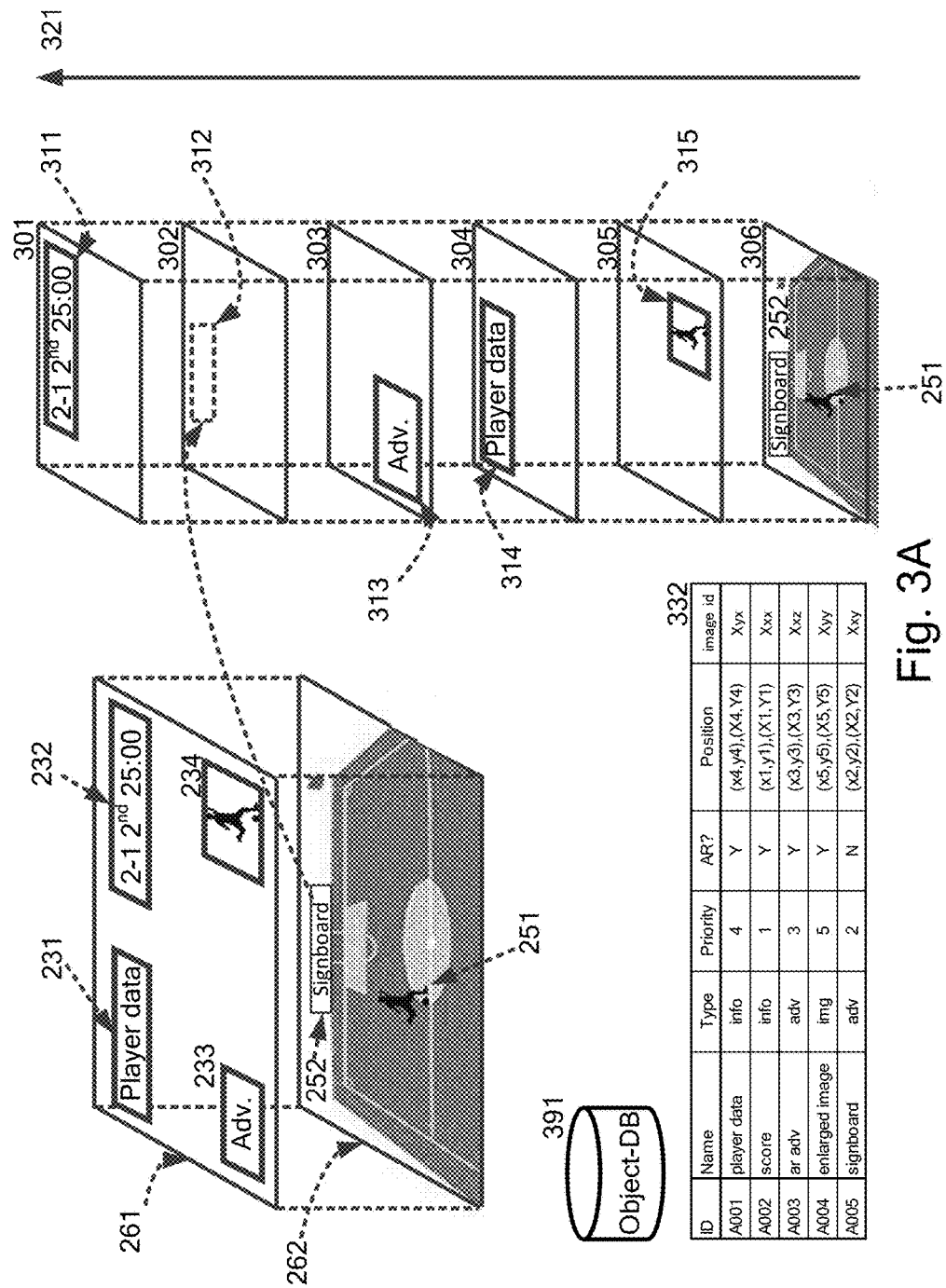
FIG. 3A illustrates a diagram of displaying AR objects and preparing transparent areas on a transparent display device, according to one embodiment of the present invention.
Figure 3B:
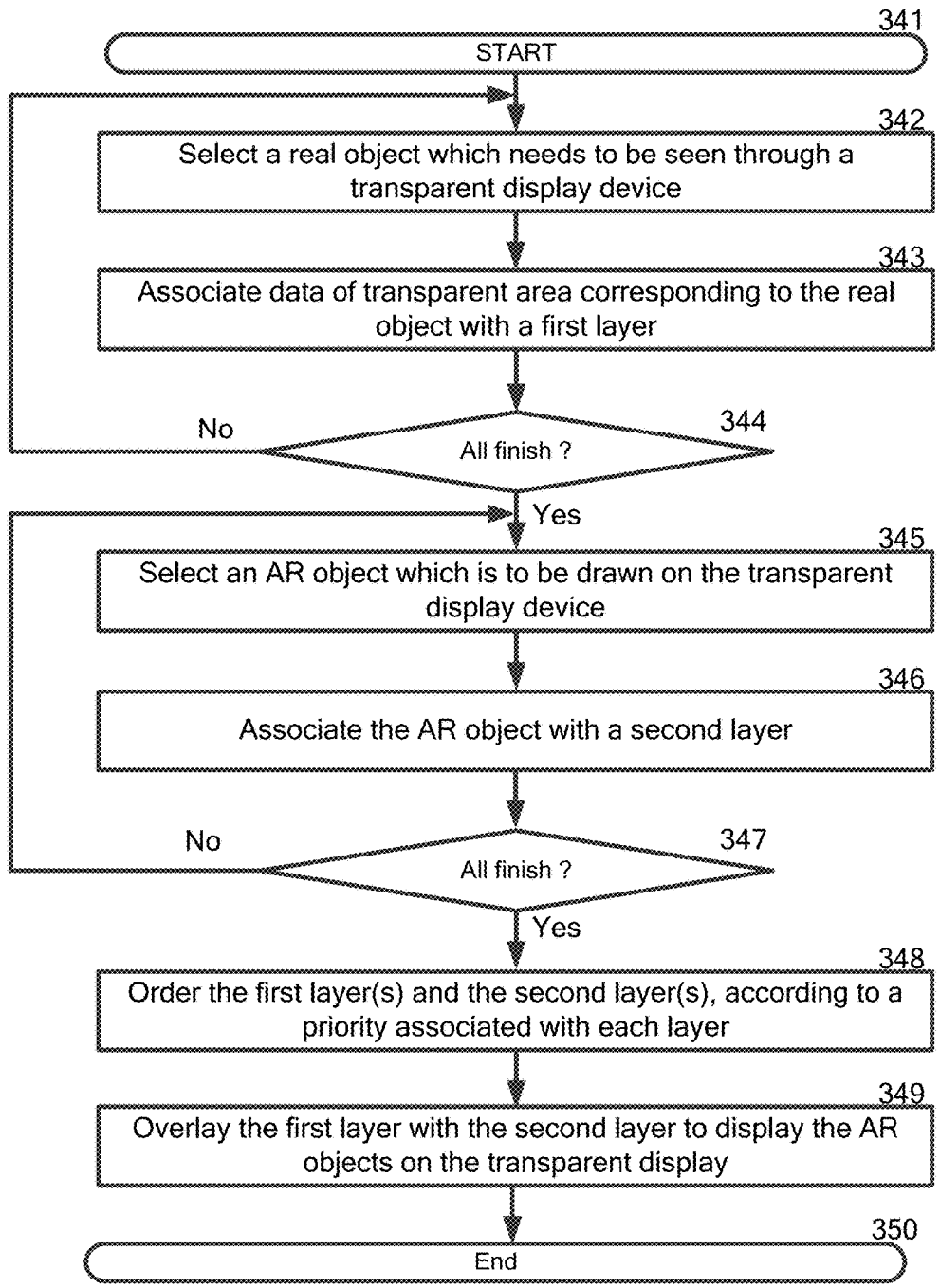
FIG. 3B illustrates an embodiment of a basic flowchart of a process for displaying AR objects and preparing transparent areas on the transparent display device, according to one embodiment of the present invention.

FIGS. 3A and 3B illustrate one embodiment of displaying AR objects and preparing transparent areas on the transparent display device, according to one embodiment of the present invention.

With reference now to FIG. 3A, FIG. 3A illustrates a diagram of displaying AR objects and preparing transparent areas on a transparent display device.

The physical structure (261) of FIG. 3B is the same as that described in FIG. 2B.

According to one embodiment of the present invention, the system may prepare layers, each of which is associated with one or more AR object or associated with transparent area corresponding to one or more real objects. The layer may be prepared in a memory or thread of the system.

Only for the sake of ease of explanation, a layer for seeing one or more real objects on the transparent display device will be mentioned as "first layer" and a layer for displaying one or more AR objects on the transparent display device will be mentioned as "second layer".

The system uses the first layer when data of one or more transparent areas corresponding to one or more real objects is associated with the first layer. The data of transparent area may have information on a location and shape of the one or more real objects on the transparent display device. The transparent area is implemented, for example, but not limited to, using an alpha channel or ARGB. The alpha channel is used for full transparency. Accordingly, user can absolutely see real objects through the transparent area, without interference by displaying one or more AR objects on the transparent area.

The logical structure (301) shows that the first layer (302) is associated with the transparent area (312) corresponding to real object (252) and each of the second layer (301, 303, 304 and 305) is associated with the AR objects (311 (or 232), 313 (or 233), 314 (or 231) and 315 (or 234), respectively).

In one embodiment, the system may associate the first layer (301) with the AR object (232) to draw the AR object (311) on the first layer (301), using a drawing application or thread #1: the system may associate the second layer (302) with the transparent area (312) to draw the transparent area (312) on the second layer (302), using a drawing application or thread #2: the system may associate the first layer (303) with the AR object (233) to draw the AR object (313) on the first layer (303), using a drawing application or thread #3. the system may associate the first layer (304) with the AR object (231) to draw the AR object (314) on the first layer (304), using a drawing application or thread #4: and the system may associate the first layer (305) with the AR object (234) to draw the AR object (315) on the first layer (305), using a drawing application or thread #5.

The system may determine a drawing order of the layers (301 to 305), according to a priority associated with each of the AR objects (231, 232, 233 and 234) and the real object (252). The system may read each priority, for example, from an object table (332) which may be stored in an object-DB (391).

The system will overlap the first layer (302) with each of the second layer (301, 303, 304 and 305) to display the AR objects (311, 313, 314 and 315), according to the priority that each layer has. The user can see the AR objects (311, 313, 314 and 315) on the transparent display. Further, the user is guaranteed to see real object, namely signboard (252) through the transparent area (312).

The object table (322) may include the following information: Name of an object; Type of an object; Priority of an object; information on whether an object is an AR object or not; a position of an object; and an image id of an object.

The type of an object may be for example, but not limited to, information (info), advertisement (adv) or image data (img). The priority of an object defines a drawing priority associated with an object. The information is Yes (Y) if the object is an AR object or No (N) if the object is not AR. The position of an object defines the position where the object is drawn on the layer. The image id of an object is a key of a bitmap image data of an AR object or data of a transparent area. The AR object may have a bitmap which may have RGB data and, optionally, transparent background data such as alpha channel data. The data of the transparent area corresponding to a real object is an image frame buffer which has only transparent background data such as alpha channel data and this means that the data of the transparent area does not have a bitmap which may have RGB data.

The system may create the object table on the fly or dynamically, for example, in response that an AR object or a transparent area to be displayed on the transparent display device is changed or objects are overlapping with each other.

In one embodiment, an administrator of the system may define priority in advance, for example, according to a type of an object.

With reference now to FIG. 3B, FIG. 3B illustrates an embodiment of a basic flowchart of a process for displaying AR objects and preparing transparent areas on the transparent display device.

In step 341, the system starts the process mentioned above.

Prior to start of step 342 mentioned below, the system may prepare an object table on the fly or dynamically.

In step 342, the system selects a real object which needs to be seen through a transparent display device. Then, the system obtains data associated with the selected real object from the object table. Further, the system prepares a first layer for seeing the selected real object on the transparent display device.

In step 343, the system associates data of one or more transparent areas corresponding to the selected real object with the first layer. The data of one or more transparent areas has information on a location and shape of the selected real object on the transparent display device.

In decision 344, the system determines whether there remains an unselected real object which needs to be seen through a transparent display device. If the judgment is positive (decision 344 "YES" branch), the system returns back to step 342 and repeats the steps 342 to 344 in order to associate data of one or more transparent areas corresponding to the unselected real object with a first layer for seeing the unselected real object on the transparent display device. If the judgment is negative (decision 344 "NO" branch), the system proceeds to step 345.

In step 345, the system selects an AR object which is to be displayed on the transparent display device. Then, the system obtains data associated with the selected AR object from the object table. Further, the system prepares a second layer for displaying the selected AR object on the transparent display device.

In step 346, the system associates the selected AR object with the second layer.

In decision 347, the system determines whether or not there remains an unselected AR object which needs which is to be displayed on the transparent display device. If the judgment is positive (decision 347 "YES" branch), the system returns back to step 345 and repeats the steps 345 to 347 in order to associate the unselected AR object with each second layer for displaying the unselected AR object on the transparent display device. If the judgment is negative (decision 347 "NO" branch), the system proceeds to step 348.

Please note that steps 342 to 344 and steps 345 to 347 may be carried out at the same time or the steps 345 to 347 may be carried out prior to the steps 342 to 344.

In optional step 348, the system may order the first layer(s) obtained from the step 343 and the second layer(s) obtained from the step 346, according to a priority associated with each layer.

In step 349, the system overlays the first layer with the second layer to display the one or more AR objects on the transparent display device.

As a result of step 349, the AR object(s) can be displayed on the transparent display device. Further, the object(s) can be seen through the one or more transparent areas on the transparent display device by transparent area the transparent display device.

In step 350, the system terminates the process mentioned above.

Figure 4A:
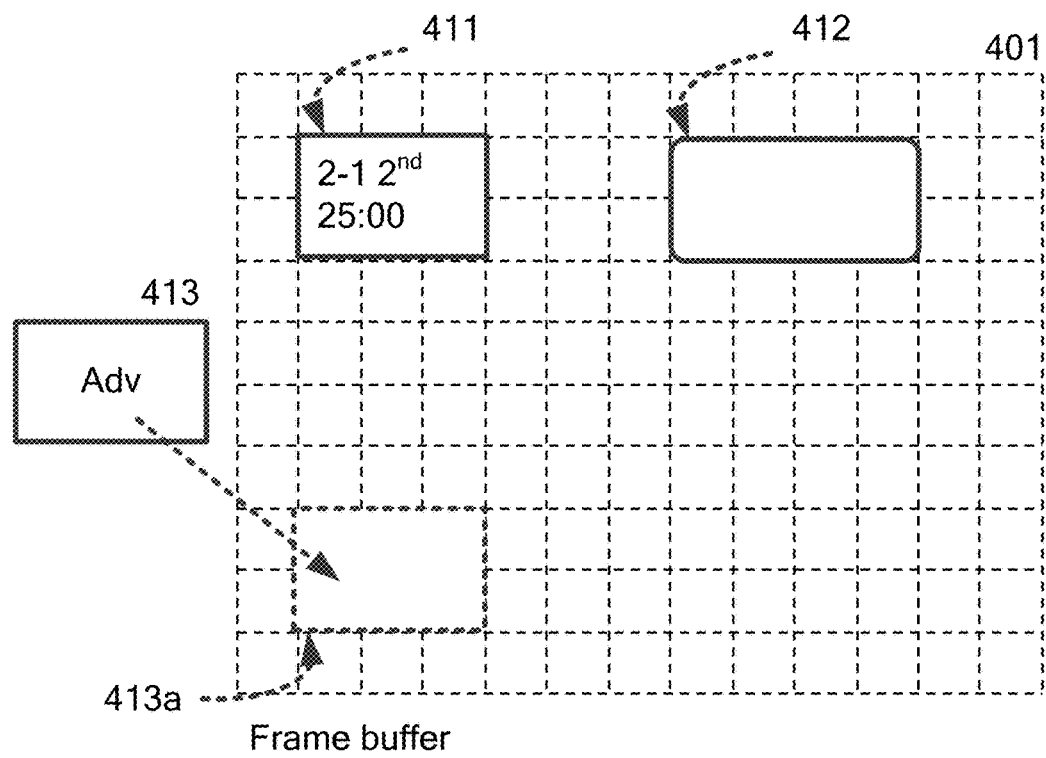
FIG. 4A illustrates a diagram of displaying AR objects and preparing transparent areas on a transparent display device, according to one embodiment of the present invention.
Figure 4A:
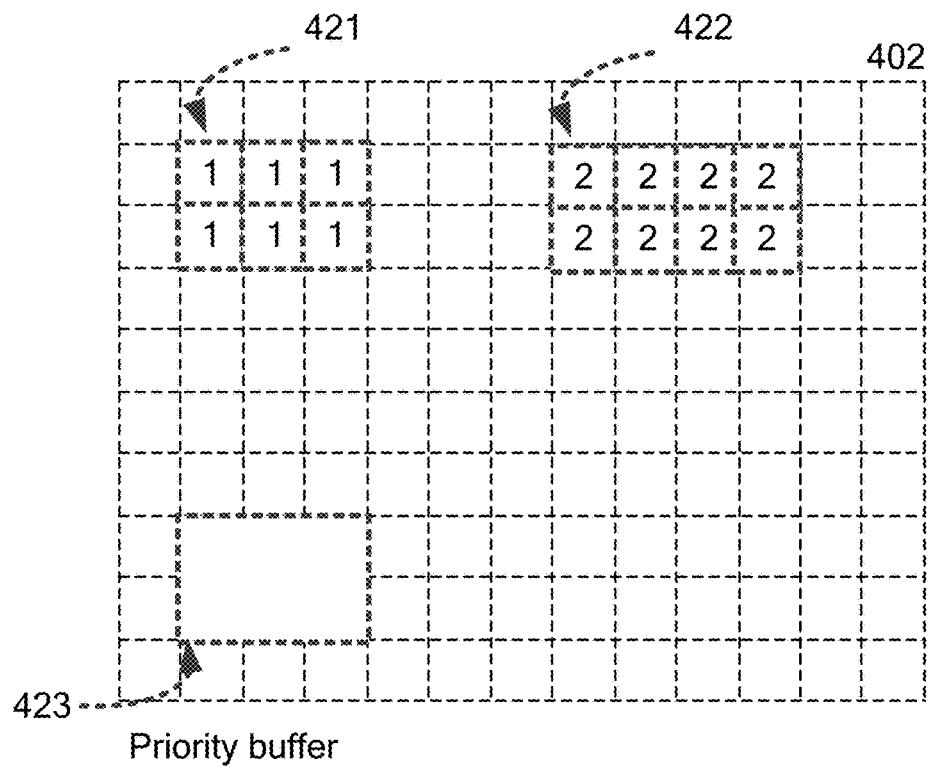
Figure 4B:
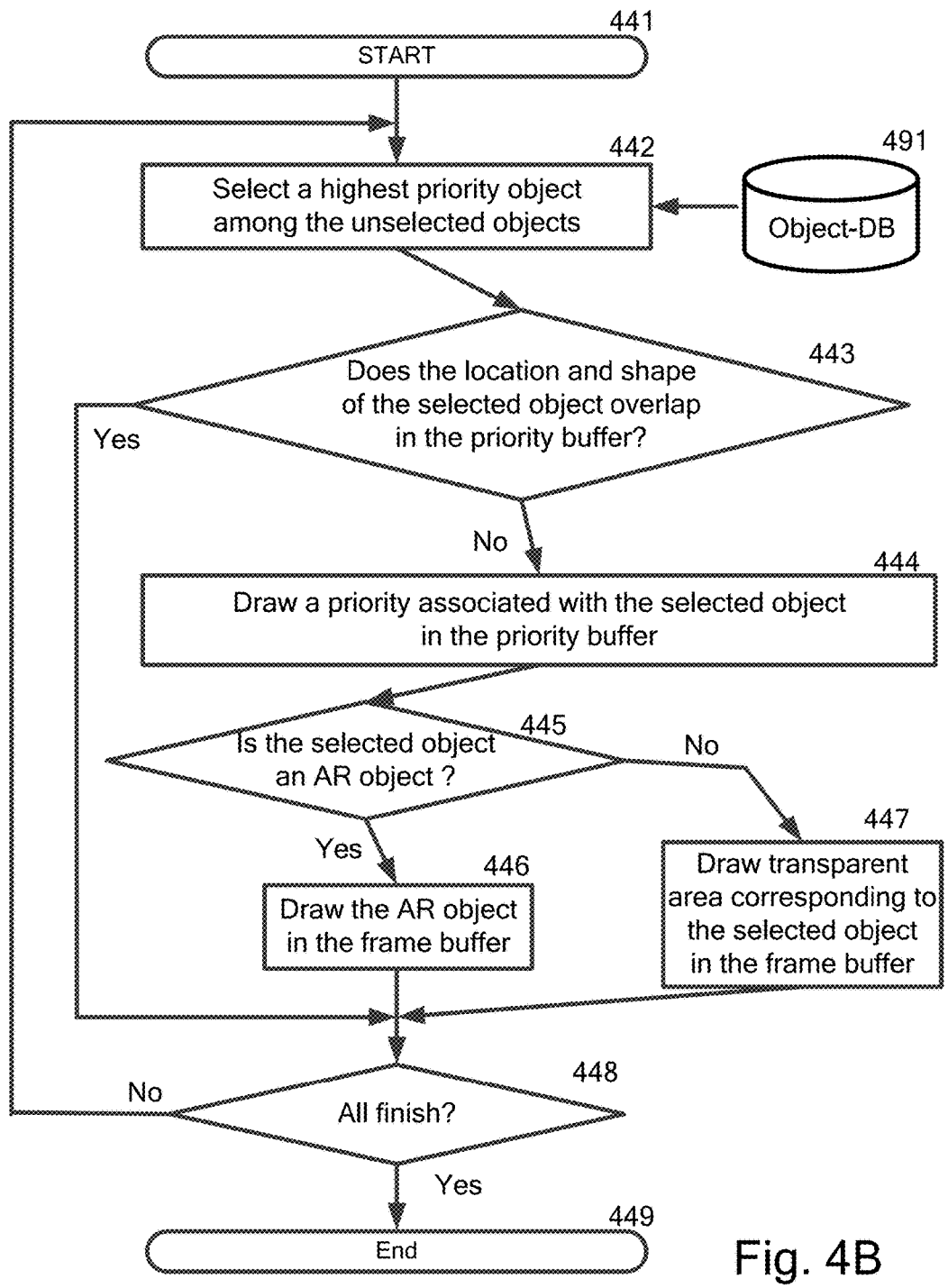
FIG. 4B illustrates an embodiment of a flowchart of a process for displaying AR objects, using a priority associated with each object, according to one embodiment of the present invention.

FIGS. 4A and 4B illustrate one embodiment of displaying AR objects and preparing transparent areas on the transparent display device, according to one embodiment of the present invention.

The system first prepares a frame buffer and a priority buffer.

The frame buffer is a memory area in a memory, such as RAM for drawing one or more AR objects and for placing one or more transparent areas corresponding to real object.

The priority buffer is a memory area on which a priority associated with each of the AR objects is drawn. The priority buffer is used for judging whether an AR object or a transparent area corresponding to real object is drawn on the frame buffer or not.

With reference now to FIG. 4A, FIG. 4A illustrates a diagram of displaying AR objects and preparing transparent areas on a transparent display device.

The system first prepares a frame buffer and a priority buffer. The system may prepare a drawing area which corresponding to a display area on the transparent display device. A priority can be drawn on the drawing area. Accordingly, the priority can be given to the drawing area, according to the information on the location and shape of each of an AR object and transparent area corresponding to a real object.

The present frame buffer is shown as the frame buffer (401). The AR object (411) and the transparent area (412) corresponding to the real object were already drawn, as seen in the frame buffer (401).

The present priority buffer is shown as the priority buffer (402). The priority "1" (421) associated with the AR object (411) and the priority "2" (422) associated with the real object corresponding to the transparent area (412) were already drawn, as seen in the priority buffer (402).

In one embodiment, the priority may be drawn on the priority buffer, according to the location and shape of the AR object or the transparent area corresponding to the real object.

Let us suppose that the AR object (413) is now moving to a position (414*a*) and the system is now judging whether the AR object (413) can be drawn at the position (414*a*) on the frame buffer (401) or not.

The detail processes of the judgment will be described in FIG. 4B mentioned below and embodiments of these will be demonstrated in FIGS. 5A and 5B mentioned below.

With reference now to FIG. 4B, FIG. 4B illustrates an embodiment of a flowchart of a process for displaying AR objects, using a priority associated with each object.

In step 441, the system starts the process mentioned above.

In step 442, the system selects a highest priority object among the unselected object which may exist in an object-DB (491). The unselected object may be an AR object or real object.

In decision 443, the system judges whether or not the location and shape of the selected object overlap with the whole or a part of the location and shape of the object(s) which was already drawn on the priority buffer. If the judgment is negative (decision 443 "NO" branch), the system proceeds to step 444. If the judgment is positive (decision 443 "YES" branch), the system proceeds to step 448 and, thus, the selected object is not drawn on the frame buffer.

In step 444, the system draws a priority associated with the selected object in the priority buffer.

In decision 445, the system judges whether the selected object is an AR object or not. If the judgment is positive (decision 445 "YES" branch), the system proceeds to step 446. If the judgment is negative (decision 445 "NO" branch), the system proceeds to step 447.

In step 446, the system draws the AR object in the frame buffer in response that the selected object is an AR object.

In step 447, the system draws transparent area corresponding to the selected object in the frame buffer in response that the selected object is a real object.

In decision 448, the system judges whether or not there remains an unselected object which may exist in an object-DB (491). If the judgment is positive (decision 448 "YES" branch), the system returns back to step 442 and repeats the steps 442 to 448. If the judgment is negative (decision 448 "NO" branch), the system proceeds to a final step 449 mentioned below.

In step 449, the system terminates the process mentioned above.

Figure 5A:
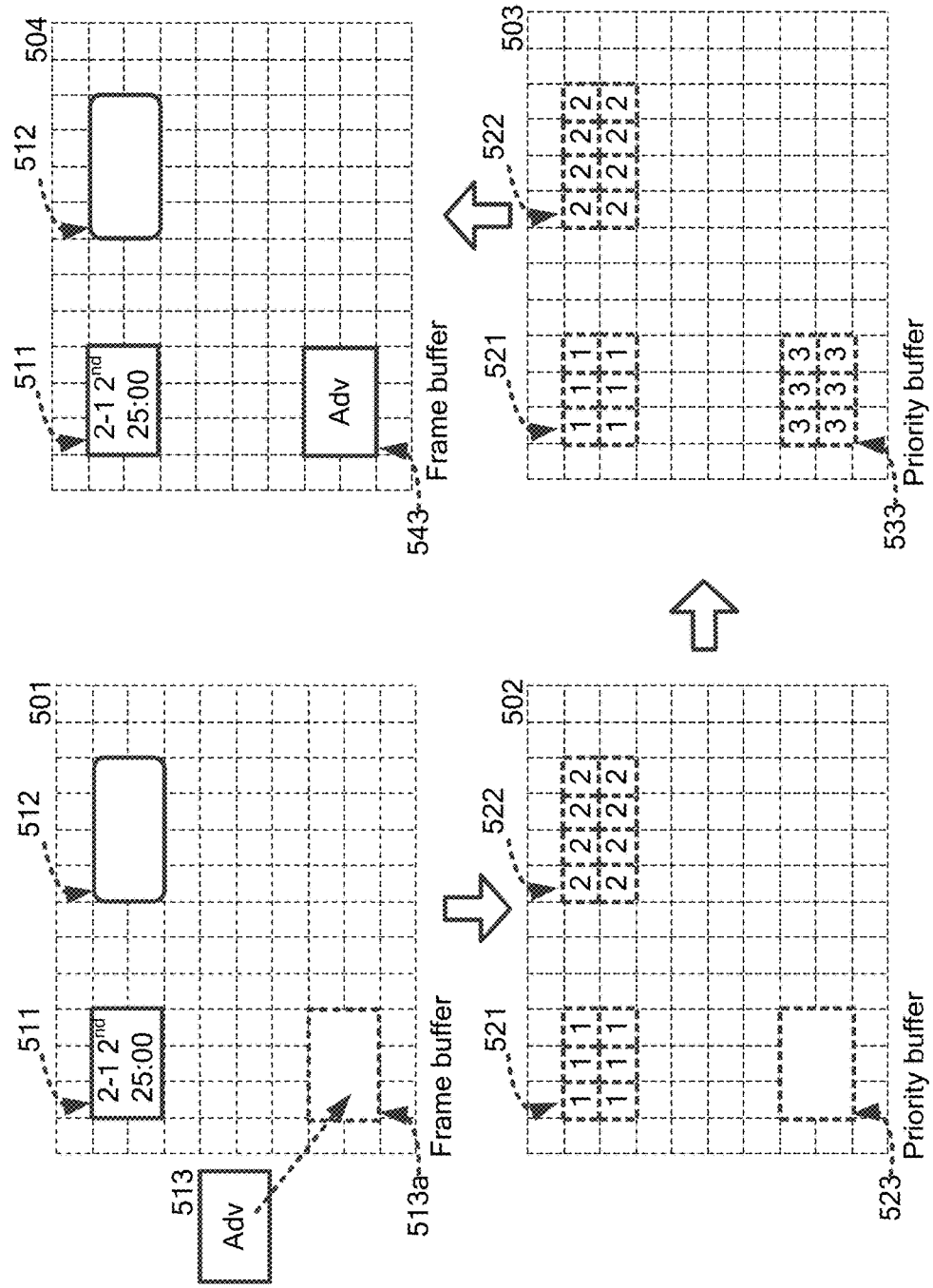
FIG. 5A illustrates a diagram of judging, using a priority associated with each object, whether AR object can be drawn on the frame buffer or not, according to one embodiment of the present invention.
Figure 5B:
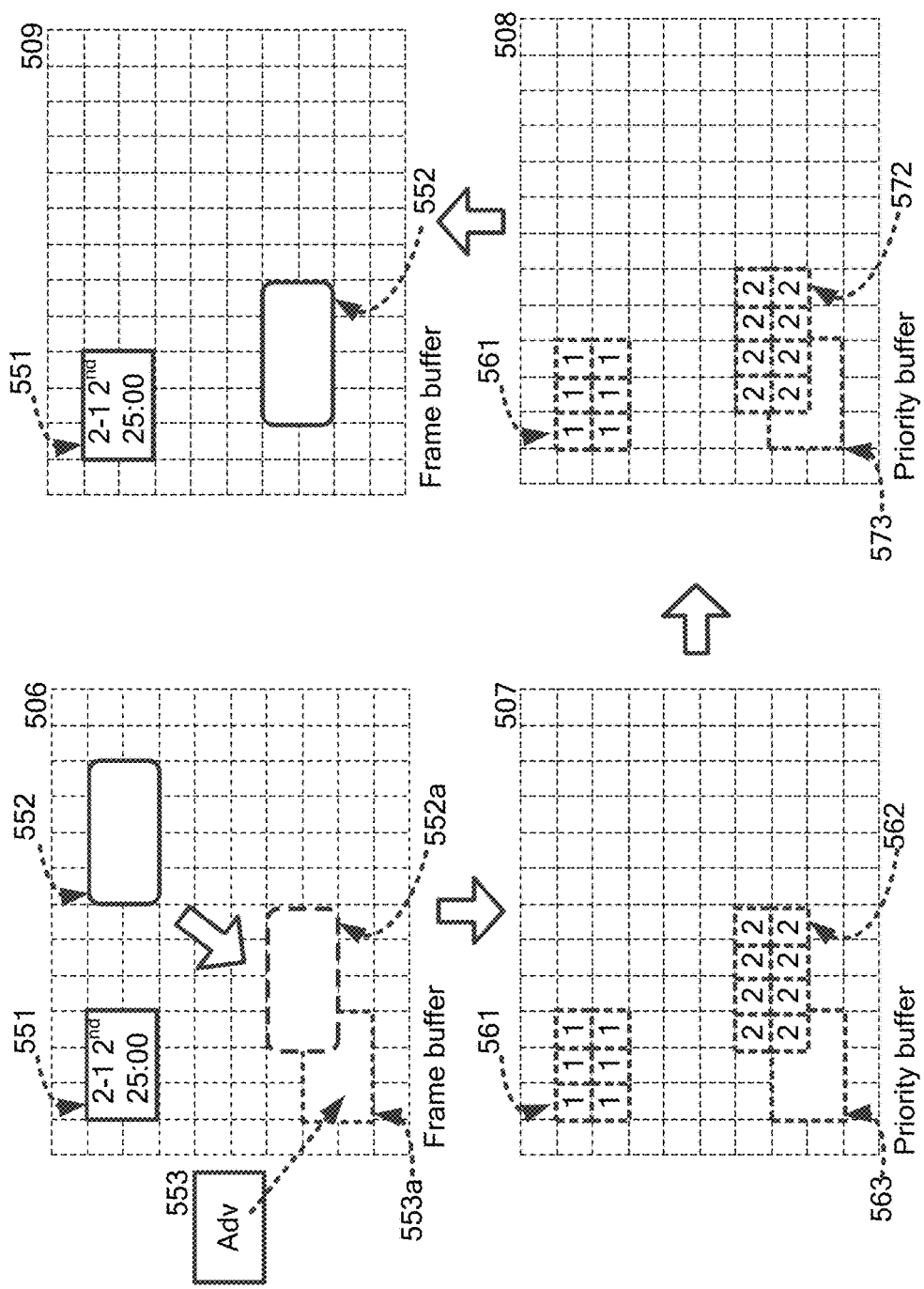
FIG. 5B illustrates a diagram of judging, using a priority associated with each object, whether AR object can be drawn on the frame buffer or not, according to one embodiment of the present invention.
Figure 6:
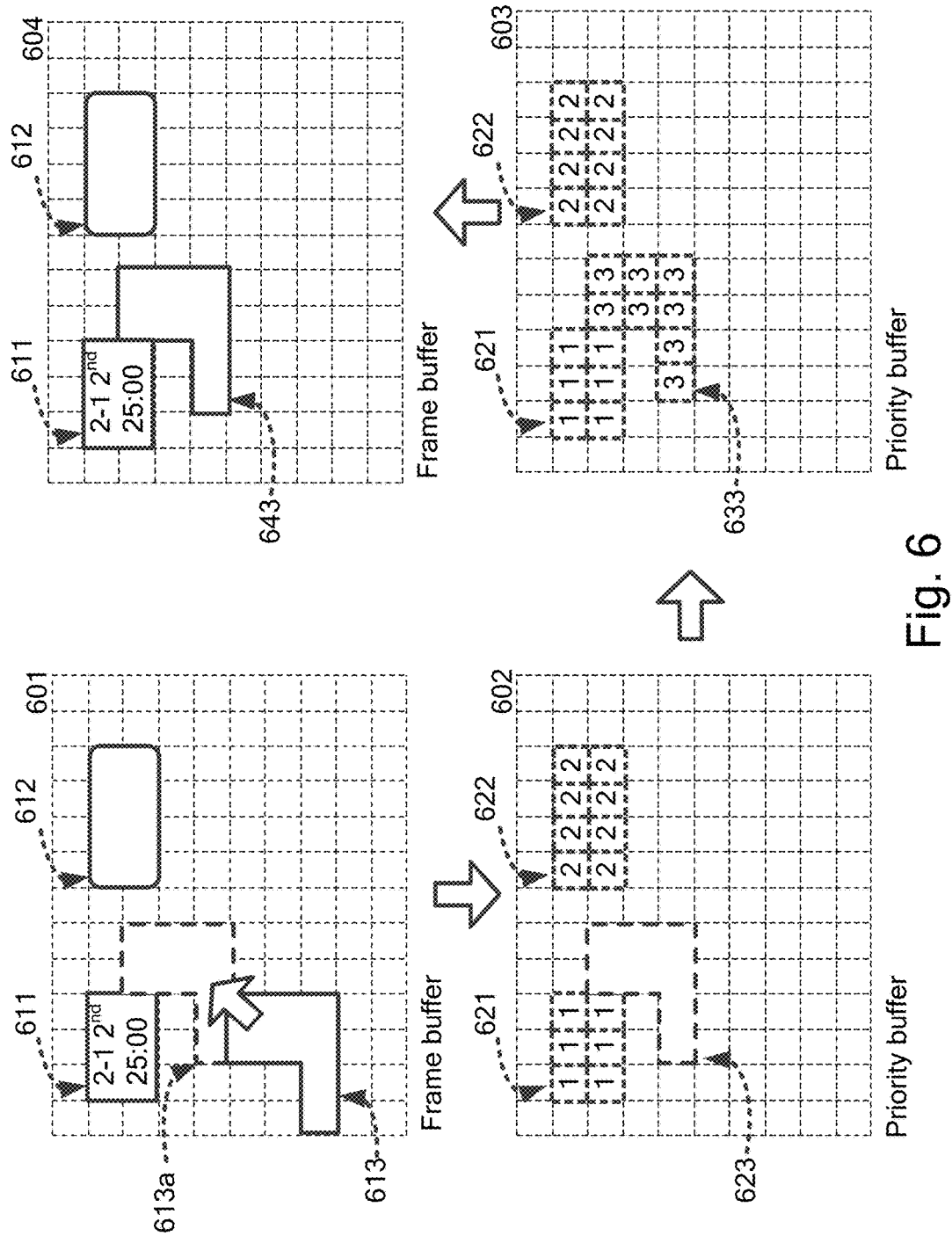
FIG. 6 illustrates a diagram of judging, using a priority associated with a real object, that the transparent area corresponding to the real object can be drawn on the frame buffer, according to one embodiment of the present invention.

FIGS. 5A, 5B and 6 illustrate a diagram of judging, using a priority associated with each object, whether AR object can be drawn on the frame buffer or not.

With reference now to FIG. 5A, FIG. 5A illustrates a diagram of judging, using a priority associated with an AR object, that the AR object can be drawn on the frame buffer.

The system first prepares a frame buffer and a priority buffer. The present frame buffer is shown as the frame buffer (501) which is the same as the frame buffer (401) described in FIG. 4A. The present priority buffer is shown as the priority buffer (502) which is the same as the priority buffer (402) described in FIG. 4A.

Let us suppose that the AR object (513) is now moving to a position (513*a*) and the system is now judging whether the AR object (513) whose priority is "3" can be drawn at the position (513*a*) on the frame buffer (501) or not.

The system judges whether or not the location and shape (523) of the AR object (513) overlap with the location and shape (521) of the AR object (511) and the location and shape (522) of the transparent area (512).

As seen in the priority buffer (502), the location and shape (523) of the AR object (513) neither overlap with the location and shape (521) of the AR object (511) nor with the location and shape (522) of the transparent area (512). Accordingly, the system judges that the location and shape (523) of the AR object (513) neither overlap with the location and shape (521) of the AR object (511) nor with the location and shape (522) of the transparent area (512).

Next, the system draws the priority "3" associated with the AR object (513) on the priority buffer, according to the location and shape (523) of the AR object (513). The priority buffer in which the priority "3" (533) associated with the AR object (513) is now drawn is shown as the priority buffer (503).

In response that priority "3" (533) associated with the AR object (513) was drawn in the priority buffer, the system draws the AR object (513) in the frame buffer. The frame buffer in which the AR object (513, now 543) is now drawn is shown as the frame buffer (504).

In response that the AR object (543) is drawn on the frame buffer, the user wearing a transparent display device can see the AR object (543) thorough the transparent display device.

With reference now to FIG. 5B, FIG. 5B illustrates a diagram of judging, using a priority associated with an AR object, that the AR object cannot be drawn on the frame buffer.

The system first prepares a frame buffer and a priority buffer. The present frame buffer is shown as the frame buffer (506) which is the same as the frame buffer (401) described in FIG. 4A. The present priority buffer is shown as the priority buffer (507) which is the same as the priority buffer (402) described in FIG. 4A.

Let us suppose that the system is now judging whether the AR object (553) whose priority is "3" can be drawn at the position (553*a*) on the frame buffer (506) or not. Further, let us suppose that the transparent area (552) is now moving to a position (552*a*), according to a movement of a face of transparent area a transparent display device.

The system judges whether or not the location and shape (563) of the AR object (553) overlap with the location and shape (561) of the AR object (551) and the location and shape (562) of the transparent area (552*a*).

As seen in the priority buffer (507), the location and shape (563) of the AR object (553) overlap with the location and shape (562) of the transparent area (552*a*) but do not overlap with the location and shape (561) of the AR object (551). Accordingly, the system judges that the location and shape (563) of the AR object (553) overlap with the location and shape (562) of the transparent area (552*a*).

Thus, the system does not draw the priority "3" associated with the AR object (553) at a position (573) on the priority buffer.

As a result, the frame buffer is not changed as seen in the frame buffer (509).

Accordingly, the user cannot see the AR object (553) thorough the transparent display device.

With reference now to FIG. 6, FIG. 6 illustrates a diagram of judging, using a priority associated with a real object, that the transparent area corresponding to the real object can be drawn on the frame buffer.

The system first prepares a frame buffer and a priority buffer.

The present frame buffer is shown as the frame buffer (601). The AR object (611) and the transparent area (612) corresponding to the real object were already drawn, as seen in the frame buffer (601).

The present priority buffer is shown as the priority buffer (602). The priority "1" (621) associated with the AR object (611) and the priority "2" (622) associated with the real object corresponding to the transparent area 612) were already drawn, as seen in the priority buffer (602).

Let us suppose that the system is now judging whether the transparent area (613) corresponding to the real object whose priority is "3" can be drawn at the position (613*a*) on the frame buffer (601) or not.

The system judges whether or not the location and shape (623) of the transparent area (613) overlap with the location and shape (621) of the AR object (611) and the location and shape (622) of the transparent area (612).

As seen in the priority buffer (602), the location and shape (623) of transparent area (613) neither overlap with the location and shape (621) of the AR object (611) nor with the location and shape (622) of the transparent area (612). Accordingly, the system judges that the location and shape (623) of transparent area (613) neither overlap with the location and shape (621) of the AR object (611) nor with the location and shape (622) of the transparent area (612).

Next, the system draws the priority "3" associated with the AR object (613) on the priority buffer, according to the location and shape (623) of the AR object (613). The priority buffer in which the priority "3" (633) associated with the real object corresponding to the transparent area (613) is now drawn is shown as the priority buffer (603).

In response that priority "3" (633) of the transparent area (613) was drawn in the priority buffer, the system draws the transparent area (613) in the frame buffer. The frame buffer in which the transparent area (613, now 643) is now drawn is shown as the frame buffer (604).

In response that the transparent area (643) is drawn on the frame buffer, the user wearing a transparent display device can see the real object thorough the transparent area (643) on the transparent display device. Namely, the user can see the real object over the transparent display device, without interference by displaying one or more AR objects on the transparent area.

Figure 7A:
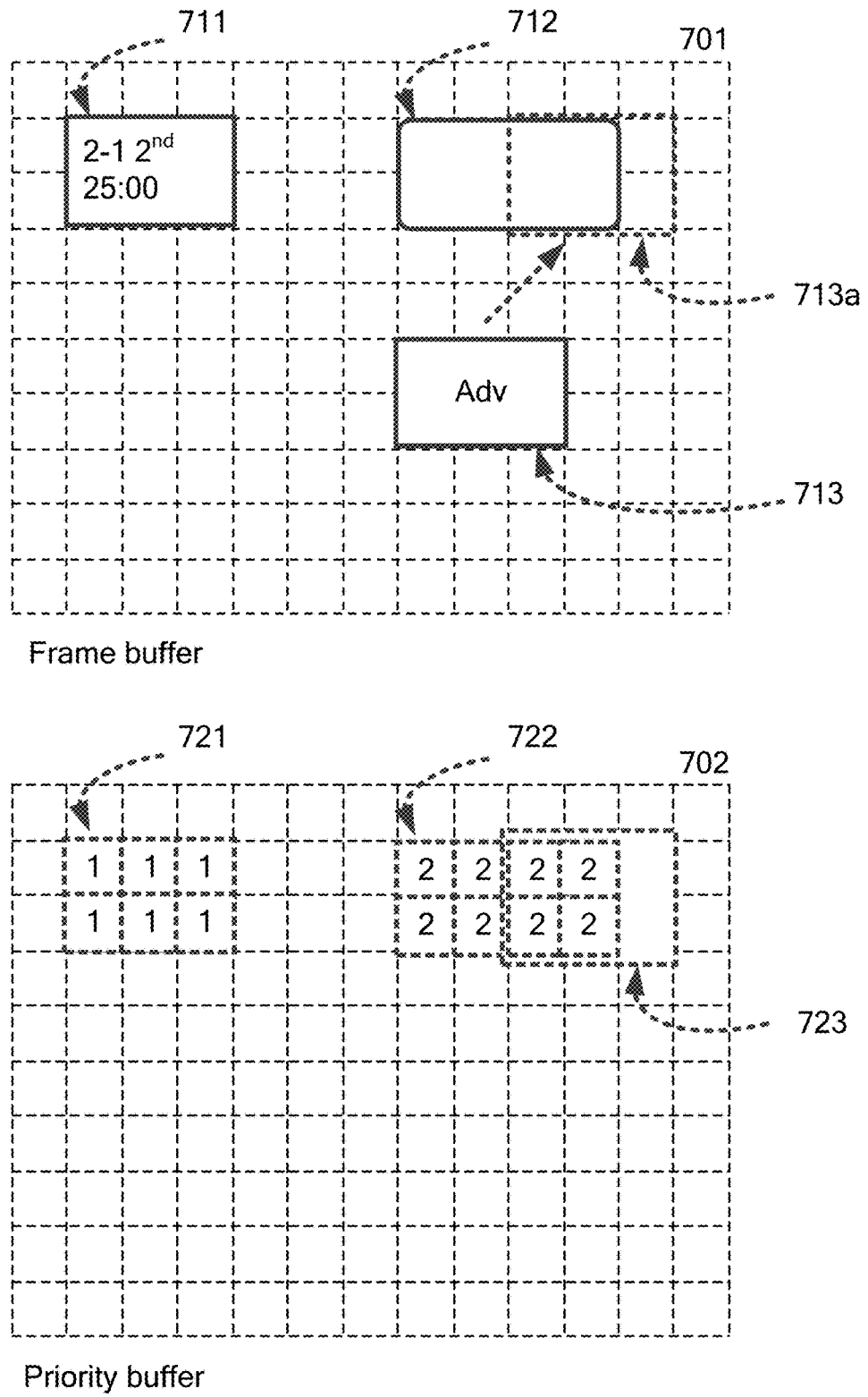
FIG. 7A illustrates a diagram of judging, using a priority associated with each object, whether AR object which will overlaps with another object can be drawn on the frame buffer or not, according to one embodiment of the present invention.
Figure 7B:
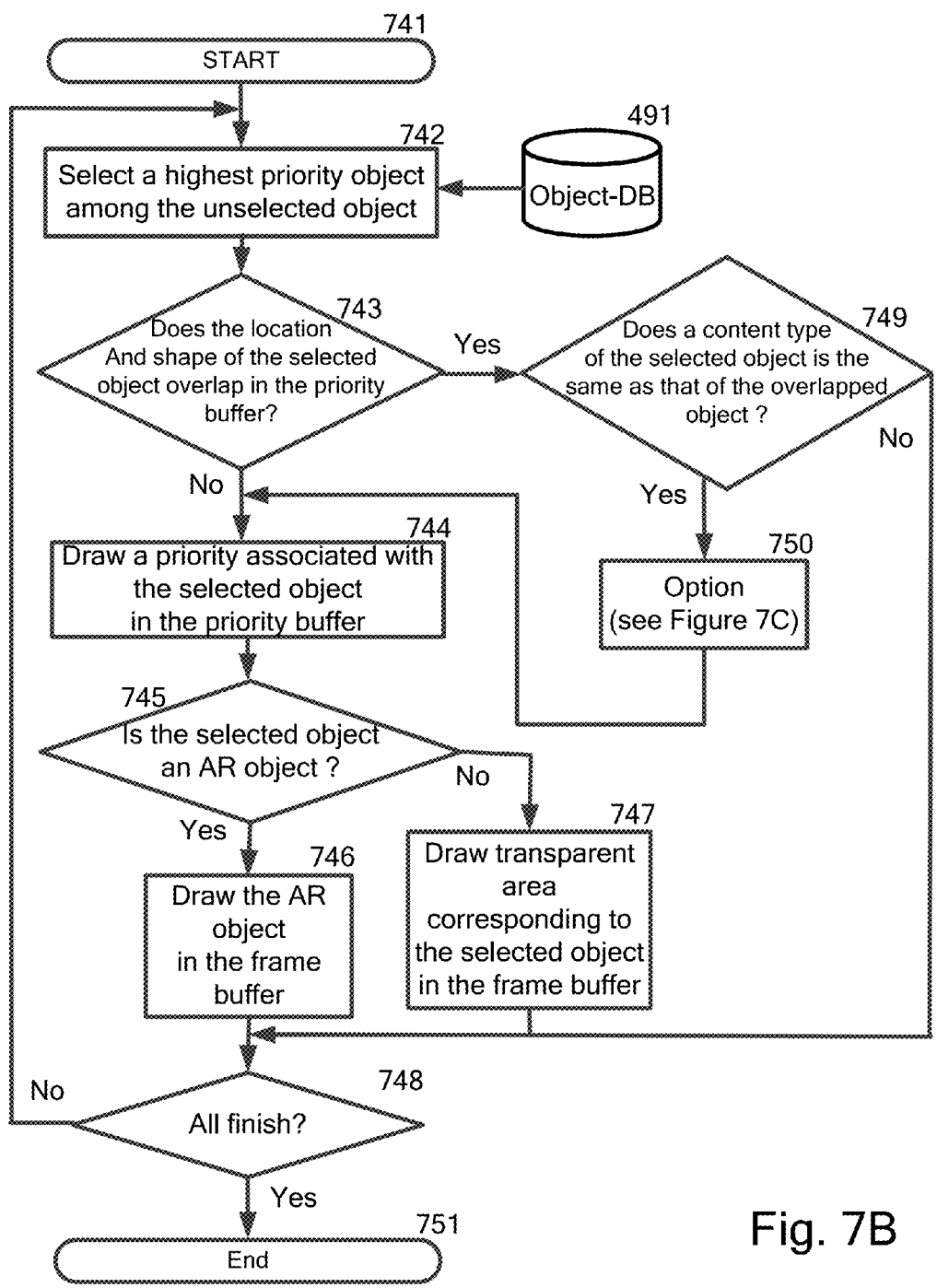
FIG. 7B illustrates an embodiment of a flowchart of a process for judging, using a priority associated with each object, whether AR object which will overlaps with another object can be drawn on the frame buffer or not, according to one embodiment of the present invention.
Figure 7C:
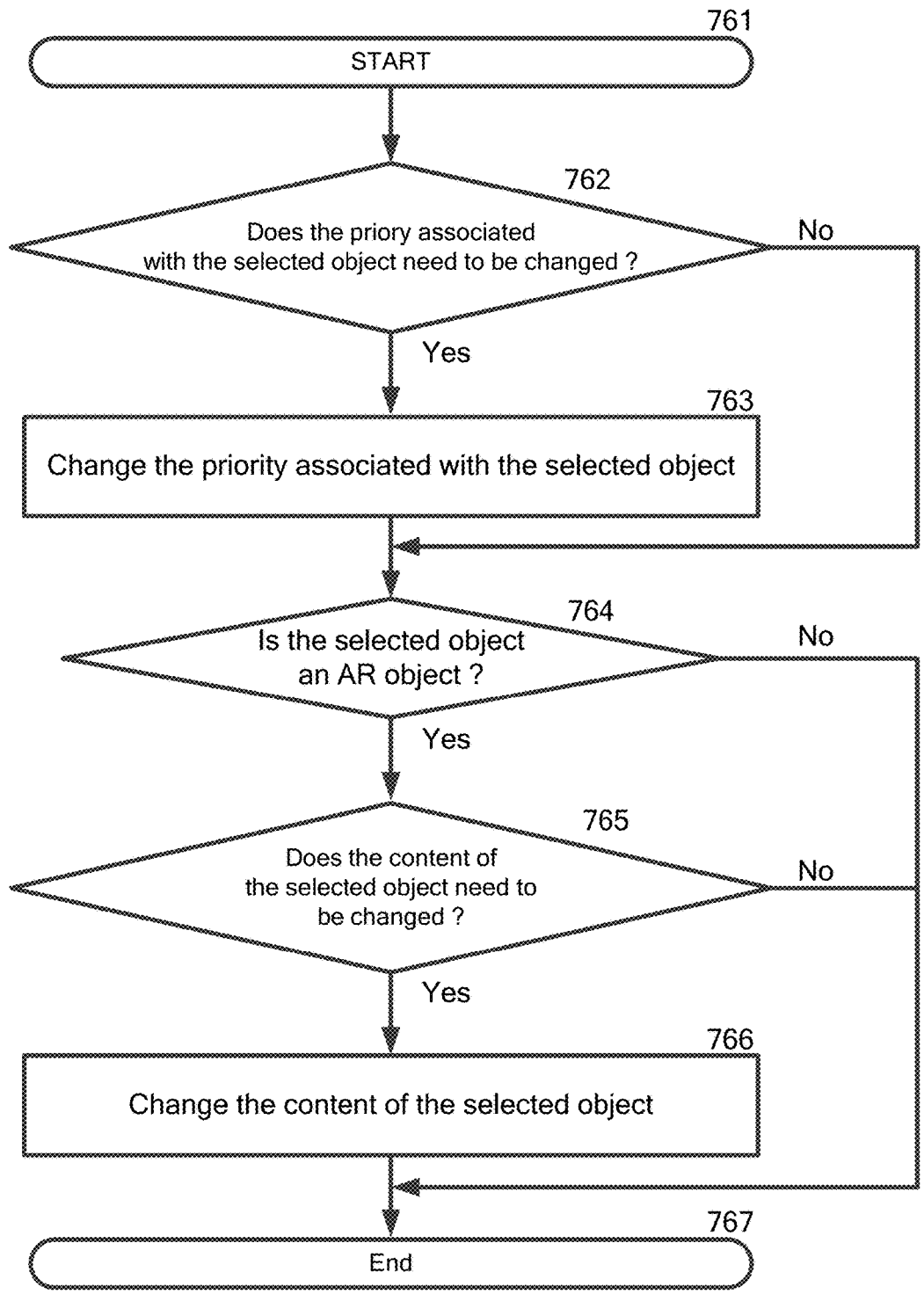
FIG. 7C illustrates an embodiment of a flowchart of a process for judging, using a priority associated with each object, whether AR object which will overlaps with another object can be drawn on the frame buffer or not, according to one embodiment of the present invention.

FIGS. 7A to 7C illustrate one embodiment of judging, using a priority associated with each object, whether AR object which will overlaps with another object can be drawn on the frame buffer or not.

With reference now to FIG. 7A, FIG. 7A illustrates a diagram of judging, using a priority associated with each object, whether AR object which will overlaps with another object can be drawn on the frame buffer or not.

The system first prepares a frame buffer and a priority buffer.

The present frame buffer is shown as the frame buffer (701). The AR object (711) and the transparent area (712) corresponding to the real object were already drawn, as seen in the frame buffer (701).

The present priority buffer is shown as the priority buffer (702). The priority "1" (721) associated with the AR object (711) and the priority "2" (722) associated with the real object corresponding to the transparent area (712) were already drawn, as seen in the priority buffer (702).

Let us suppose that the AR object (713) is now moving to a position (713*a*) and the system is now judging whether the AR object (713) can be drawn at the position (713*a*) on the frame buffer (701) or not.

The detail processes of the judgment will be described in FIGS. 7B and 7C mentioned below and embodiments of these will be demonstrated in FIGS. 8A to 8C mentioned below.

With reference now to FIG. 7B, FIG. 7B illustrates an embodiment of a flowchart of a process for judging, using a priority associated with each object, whether AR object which will overlaps with another object can be drawn on the frame buffer or not.

In step 741, the system starts the process mentioned above.

In step 742, the system selects a highest priority object among the unselected object which may exist in an object-DB (491). The unselected object may be an AR object or real object.

In decision 743, the system determines whether or not the location and shape of the selected object overlap with the whole or a part of the location and shape of the object(s) which was already drawn on the priority buffer. If the judgment is negative (decision 743 "NO" branch), the system proceeds to step 744. If the judgment is positive (decision 743 "YES" branch), the system proceeds to step 749.

In step 744, the system draws a priority associated with the selected object in the priority buffer.

In decision 745, the system determines whether the selected object is an AR object or not. If the judgment is positive (decision 745 "YES" branch), the system proceeds to step 746. If the judgment is negative (decision 745 "NO" branch), the system proceeds to step 747.

In step 746, the system draws the AR object in the frame buffer in response that the selected object is an AR object.

In step 747, the system draws transparent area corresponding to the selected object in the frame buffer in response that the selected object is a real object.

In decision 748, the system determines whether or not there remains an unselected object which may exist in an object-DB (491). If the judgment is positive (decision 748 "YES" branch), the system returns back to step 742 and repeats the steps 742 to 748 and 749 to 750. If the judgment is negative (decision 748 "NO" branch), the system proceeds to a final step 781 mentioned below.

In decision 749, the system determines whether a content type of the selected object is the same as that of the overlapped object. If the judgment is positive (decision 749 "YES" branch), the system proceeds to an optional step 750 or to a step 744. If the judgment is negative (decision 749 "NO" branch), the system proceeds to step 748 and, thus, the selected object is not drawn on the frame buffer.

The detail processes of the optional step 750 will be described in FIG. 7C mentioned below and embodiments of these will be demonstrated in FIGS. 8A to 8C mentioned below.

In step 751, the system terminates the process mentioned above.

With reference now to FIG. 7C, FIG. 7C illustrates an embodiment of a detail flowchart of an optional step 750 described in FIG. 7B.

In step 761, the system starts the optional step 750 from FIG. 7B.

In decision 762, the system determines whether the priority associated with the selected object needs to be changed or not. If the judgment is positive (decision 762 "YES" branch), the system proceeds to step 763. If the judgment is negative (decision 762 "NO" branch), the system proceeds to a final step 767.

The determination of step 762 may be carried out by considering, for example, but not limited to, a characteristic or condition of a user, or statical information of users.

The characteristic of a user may be, for example, but not limited to, a gender of the user, an age of the user, an occupation of the user, an expertise of the user, a preference of the user, a location of the user, or a combination of these. The characteristic of a user may be stored in a user database for implementing an embodiment of the present invention.

The condition of a user may be, for example, but not limited to, a degree of concentration of a user, or a direction of an eye gaze of a user.

The concentration of a user may be obtained by collecting data of a user from a sensor equipped with a transparent display device or equipped with, for example, but not limited to, a ceiling or pole and then calculating a degree of concentration of the user. Alternatively, the concentration of a user may be obtained by taking video of a user, using the video camera and then analyzing the video data which records a user behavior or facial expression to calculate a degree of concentration of the user. A video camera may be equipped with a transparent display device or equipped with, for example, but not limited to, a ceiling or pole. Any sensor known in the art for measuring concentration can be used such as VibraImage, JINS MEME, ZMP® Fp1 Electrometer-Z.

The direction of an eye gaze may be obtained from an eye-tracking sensor or video camera equipped with a transparent display device or equipped with, for example, but not limited to, a ceiling or pole. Any eye-tracking sensor known in the art for measuring concentration can be used.

The statical information of a user may be, for example, but not limited to, a concentration level of the users, or a direction to which a majority of the users pay attention.

The concentration level of the users may be obtained by deciding a degree of concentration of each of a plurality of users and deciding a concentration level of the users, based on the decided degrees of concentration.

The direction to which a majority of the users pay attention may be obtained by detecting a direction of an eye gaze of each of a plurality of users and, then, deciding a direction to which a majority of the users pay attention, based on the detected directions.

Let us suppose the following cases: the selected object is an AR object whose priority is "3"; the AR object is an advertisement of a green tea; the overlapped object is a real object whose priority is "2"; the real object is an advertisement of a carbonated drink; the characteristic is a preference of the user and an age of the user; the preference of the user is a green tea; and the age of the user is 30 years old. In these situations, it is preferable that the real object of the advertisement of the carbonated drink should be replaced with an AR object of the advertisement of the green tea. The priority "2" associated with the real object is higher than the priority "3" associated with the AR object. Therefore, the AR object cannot be displayed on the real object over the transparent display device, if the priority is not changed. However, it is preferable to display the advertisement of the green tea instead of the advertisement of the carbonated drink, in view of the characteristic of the user. Accordingly, the system may judge that the priority associated with the real object is changed to be lower than that associated with the AR object in order to hide the real object using the AR object.

Let us suppose the following cases: the selected object is an AR object whose priority is "3"; the AR object is an advertisement of a yogurt product; the overlapped object is a real object whose priority is "2"; the real object is an advertisement of a coffee drink; the characteristic is an age of the user; and the age of the user is ten years. In these situations, it is preferable that the real object of the advertisement of the coffee drink should be replaced with the AR object of the advertisement of the yogurt product. The priority "2" associated with the real object is higher than the priority "3" associated with the AR object. Therefore, the AR object cannot be displayed on the real object over the transparent display device, if the priority is not changed. However, it is preferable to display the advertisement of the yogurt product instead of the advertisement of the coffee drink, according to the characteristic of the user, in view of the age of the user. Accordingly, the system may judge that the priority associated with the real object is changed to be lower than that associated with the AR object in order to hide the real object using the AR object.

In step 763, the system changes the priority associated with the selected object, for example, according to the characteristic of the user.

In decision 764, the system determines whether the selected object is an AR object or not. If the judgment is positive (decision 764 "YES" branch), the system proceeds to step 765. If the judgment is negative (decision 764 "NO" branch), the system proceeds to a final step 767.

In decision 765, the system determines whether the content of the selected object need to be changed or not. If the judgment is positive (decision 765 "YES" branch), the system proceeds to step 766. If the judgment is negative (decision 765 "NO" branch), the system proceeds to a final step 767.

The determination of step 765 may be carried out by considering, for example, but not limited to, a characteristic or condition of a user, or statical information of users, which are mentioned above.

Let us suppose the following cases: the selected object is an AR object whose priority is "1"; the AR object is an advertisement of a sugar-free drink; the overlapped object is a real object whose priority is "2"; the real object is an advertisement of a soft drink; the characteristic is a preference of the user; and the preference of the user is a natural water product. In these situations, the priority "1" associated with the AR object is higher than the priority "2" associated with the real object. Therefore, the AR object or the advertisement of the sugar-free drink will be displayed on the real object or the advertisement of the soft drink over the transparent display device. However, it is preferable to display the advertisement of the natural water product instead of the advertisements of the sugar-free drink and soft drink, in view of the characteristic of the user. Accordingly, the system may judge that the AR content of the AR object is replaced an AR content of the sugar-free drink with an AR content of the natural water product in order to display the advertisement of the natural water product as the AR object.

In step 766, the system changes the AR content of the selected object, for example, according to the characteristic of the user. In one embodiment, the system may display the AR content after the replacement on a transparent area corresponding to the real object or nearby. In another embodiment, the system may display the AR content after the replacement so that a displaying area of the AR content after the change does not overlap with a transparent area corresponding to the real object.

In step 767, the system terminates the process mentioned above.

The system may carry out steps 762 and 763, steps 764 to 766, or both of these.

Figure 8A:
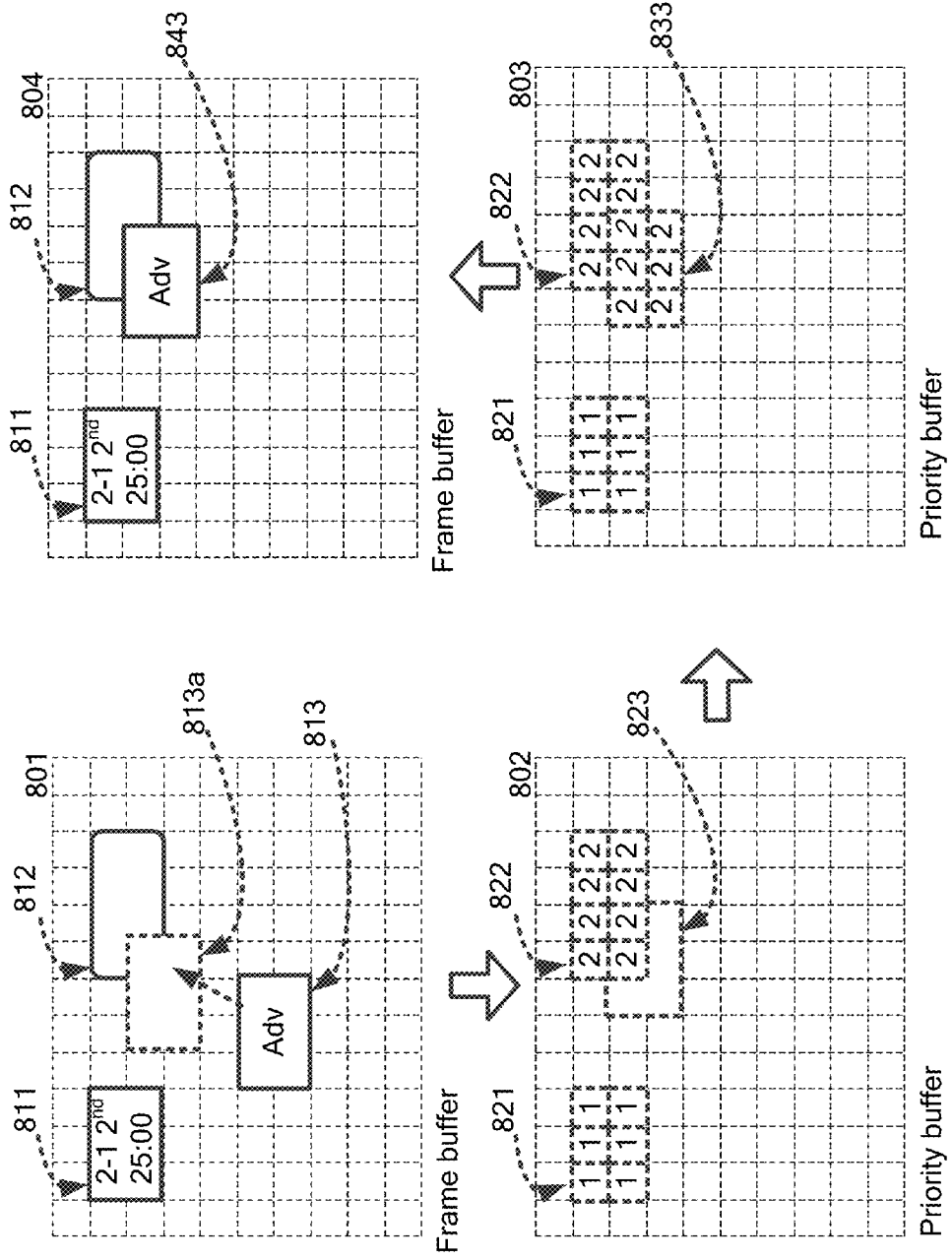
FIG. 8A illustrates a diagram of judging whether the AR object can be drawn on the frame buffer or not, if the location and shape of the AR object overlap with the whole or a part of the location and shape of the object(s) which was already drawn on a priority buffer, according to one embodiment of the present invention.
Figure 8B:
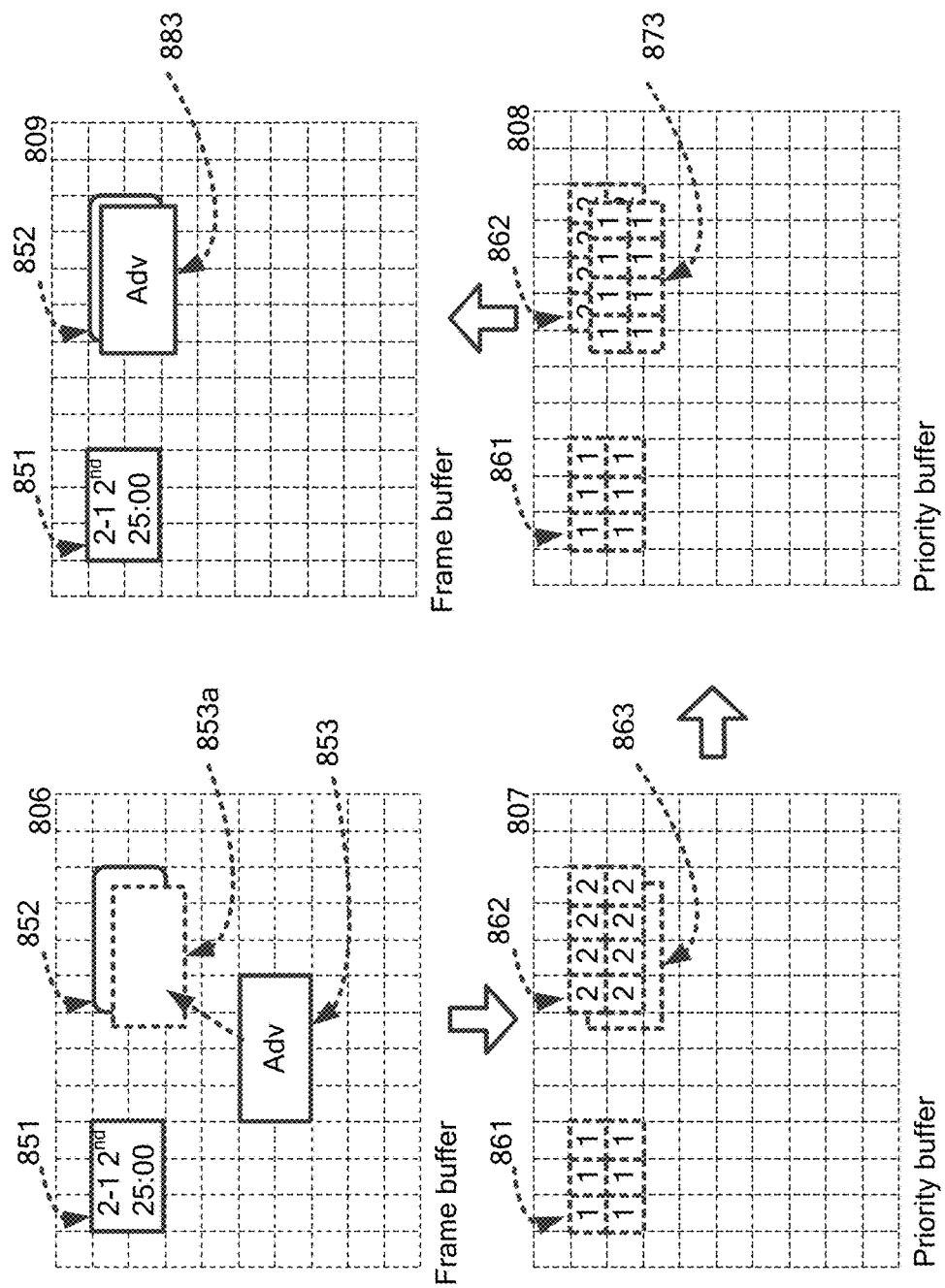
FIG. 8B illustrates a diagram of judging whether the AR object can be drawn on the frame buffer or not, if the location and shape of the AR object overlap with the whole or a part of the location and shape of the object(s) which was already drawn on a priority buffer, according to one embodiment of the present invention.
Figure 8C:
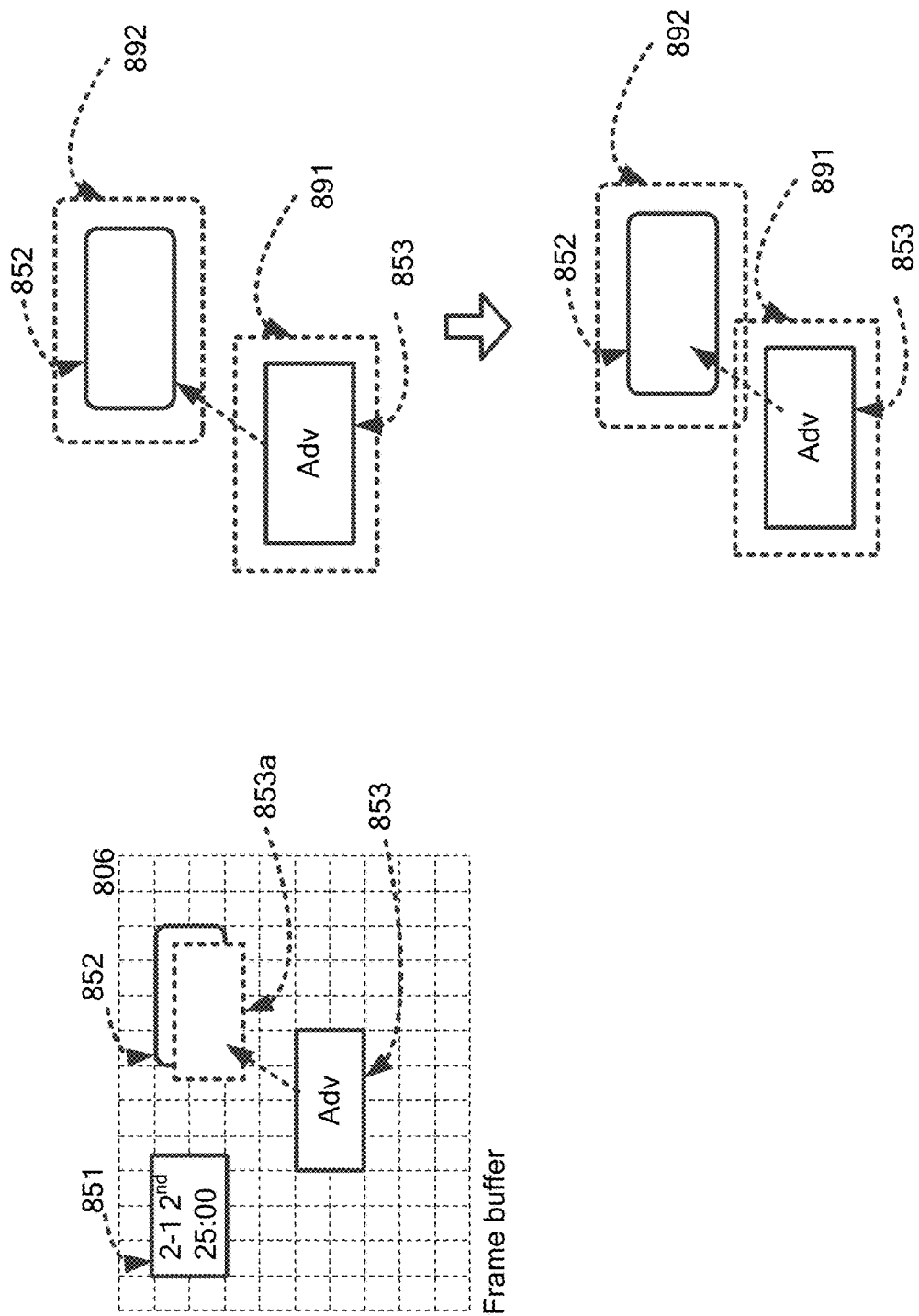
FIG. 8C illustrates a diagram of a method of judging whether an object overlaps with another object, according to one embodiment of the present invention.

FIGS. 8A to 8C illustrates a diagram of judging whether the AR object can be drawn on the frame buffer or not, if the location and shape of the AR object overlap with the whole or a part of the location and shape of the object(s) which was already drawn on a priority buffer.

With reference now to FIG. 8A, FIG. 8A illustrates a diagram of judging whether the AR object can be drawn on the frame buffer or not.

The system first prepares a frame buffer and a priority buffer.

The present frame buffer is shown as the frame buffer (801). The AR objects (811 and 813) and the transparent area (812) corresponding to the real object were already drawn, as seen in the frame buffer (801).

The present priority buffer is shown as the priority buffer (802). The priority "1" (821) associated with the AR object (811) and the priority "2" (822) associated with the real object corresponding to the transparent area (812) were already drawn, as seen in the priority buffer (802).

Let us suppose that the AR object (813) is now moving to a position (813a) and the system is now judging whether the AR object (813) whose priority is "2" can be drawn at the position (813a) on the frame buffer (801) or not.

The system judges whether or not the location and shape (823) of the AR object (813) overlap with the location and shape (821) of the AR object (811) and the location and shape (822) of the transparent area (812).

As seen in the priority buffer (802), the location and shape (823) of the AR object (813) partially overlap with the location and shape (822) of the transparent area (812) but do not overlap the location and shape (821) of the AR object (811). Accordingly, the system judges that the location and shape (823) of the AR object (813) partially overlap with the location and shape (822) of the transparent area (812) but not overlap with the location and shape (821) of the AR object (811).

The priority associated with the AR object (813) and the priority associated with the real object corresponding to the transparent area (812) is the same of "2".

Accordingly, the system draws the priority "2" associated with the AR object (813) on the priority buffer, according to the location and shape (823) of the AR object (813). The system draws a priority on the overlapped area where the priority associated with the real object corresponding to the transparent area (812) is already drawn.

The priority buffer in which the priority "2" (833) associated with the AR object (813) is now drawn is shown as the priority buffer (803). The emphasis parts in the priority buffer (803) show the overlapped area where the priority associated with the real object corresponding to the transparent area (812) is already drawn.

In response that priority "2" (833) associated with the AR object (813) was drawn in the priority buffer, the system draws in the frame buffer the AR object (813) by overlapping with the transparent area (812). The frame buffer in which the AR object (813, now 843) is now drawn is shown as the frame buffer (804).

In response that the AR object (843) is drawn on the frame buffer, the user wearing a transparent display device can see the AR object (843) through the transparent display device and see the real object through the transparent area (812) where the AR object (843) is not overlapped.

With reference now to FIG. 8B, FIG. 8B illustrates a diagram of judging whether the AR object can be drawn on the frame buffer or not.

The system first prepares a frame buffer and a priority buffer.

The present frame buffer is shown as the frame buffer (806). The AR objects (851 and 853) and the transparent area (852) corresponding to the real object were already drawn, as seen in the frame buffer (806).

The present priority buffer is shown as the priority buffer (807). The priority "1" (861) associated with the AR object (851) and the priority "2" (862) associated with the real object corresponding to the transparent area (852) were already drawn, as seen in the priority buffer (807).

Let us suppose that the AR object (853) is now moving to a position (853a) and, the system is now judging whether the AR object (853) whose priority is "1" can be drawn at the position (853a) on the frame buffer (806) or not.

The system judges whether or not the location and shape (863) of the AR object (853) overlap with the location and shape (861) of the AR object (851) and the location and shape (862) of the transparent area (852).

As seen in the priority buffer (807), the location and shape (863) of the AR object (853) almost overlap with the location and shape (862) of the transparent area (852) but do not overlap the location and shape (861) of the AR object (851). Accordingly, the system judges that the location and shape (863) of the AR object (853) almost overlap with the location and shape (862) of the transparent area (852) but not overlap with the location and shape (861) of the AR object (851).

The priority associated with the AR object (853) and the priority associated with the real object corresponding to the transparent area (852) is the same of "2".

The system judges whether the priority associated with AR object (853) needs to be changed or not. The judgment is carried out by considering, for example, but not limited to, a characteristic or condition of a user, or statical information of users. The system judges that the priority associated with AR object (853) needs to be changed such that the priority associated with AR object (853) becomes higher than the priority associated with the real object corresponding to the transparent area (852). Accordingly, the system changes the priority associated with the real object corresponding to the transparent area (852) from "2" to "1".

Accordingly, the system draws the priority "1" associated with the AR object (853) on the priority buffer, according to the location and shape (863) of the AR object (853). Accordingly, the priority "1" associated with the AR object (853) is drawn in a manner of overlapping with the priority "2" (862) associated with the real object corresponding to the transparent area (852).

The priority buffer in which the priority "1" (873) associated with the AR object (853) is now drawn is shown as the priority buffer (808).

In response that priority "1" (873) associated with the AR object (813) was drawn in the priority buffer, the system draws in the frame buffer the AR object (883) by overlapping with the transparent area (852). The frame buffer in which the AR object (853, now 883) is now drawn is shown as the frame buffer (809).

In response that the AR object (883) is drawn on the frame buffer, the user wearing a transparent display device can see the AR object (883) thorough the transparent display device and see the real object through the transparent area (852) where the AR object (883) is not overlapped.

With reference now to FIG. 8C, FIG. 8C illustrates a diagram of a method of judging whether an object overlaps with another object.

The system can detect a displaying location of a first AR object or first transparent area is approaching, on the transparent display device, a displaying location of a second AR object or second transparent area, as follows.

The frame buffer (806) is the same as that described in FIG. 8B.

The AR object (853) may have transparent region (891) adjacent to a surrounding area of the AR object (853). Also, the transparent area (852) may have transparent region (892) adjacent to a surrounding area of the transparent area (852).

When the AR object (853) is approaching to a display location of the transparent area (892) (see, FIG. 8C, right column, upper part), the system can detect such approach by partially overlapping the transparent region (891) adjacent to a surrounding area of the AR object (853) with the transparent region (892) adjacent to a surrounding area of the transparent area (852) (see, FIG. 8C, right column, lower part).

FIGS. 9A to 9E illustrates an embodiment of a flowchart of an optional process performed according to an embodiment of the present invention.

Figure 9A:
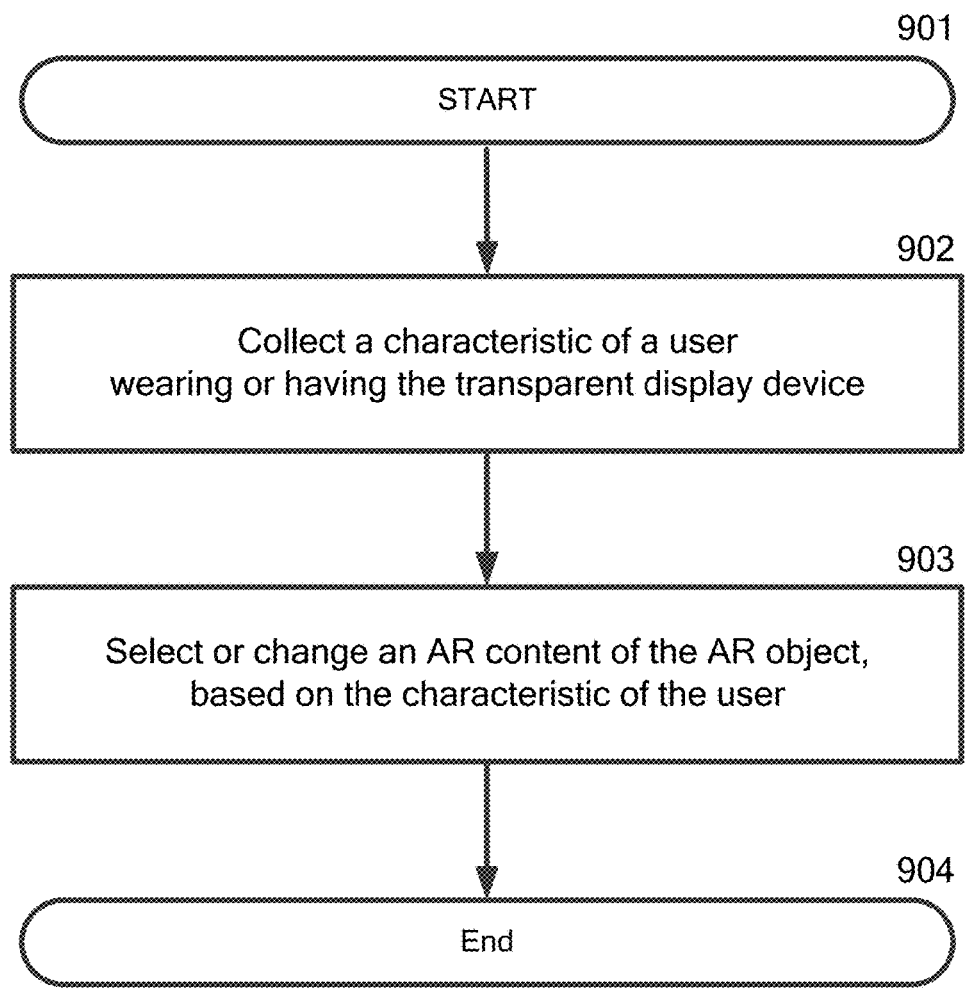
FIG. 9A illustrates an embodiment of a flowchart of a process for selecting an AR content of the AR object, according to one embodiment of the present invention.

With reference now to FIG. 9A, FIG. 9A illustrates an embodiment of a flowchart of a process for selecting or changing an AR content of the AR object.

In step 901, the system starts the process mentioned above. The system may start the process prior to start of step 345 described in FIG. 3B.

In step 902, the system collects a characteristic of a user wearing or having a transparent display device. An example of the characteristic of a user is mentioned above.

In step 903, the system may select an AR content of the AR object, based on the characteristic of the user. Alternatively, the system may change a present AR content of the AR object with another AR content, based on the characteristic of the user.

In step 904, the system terminates the process mentioned above.

Figure 9B:
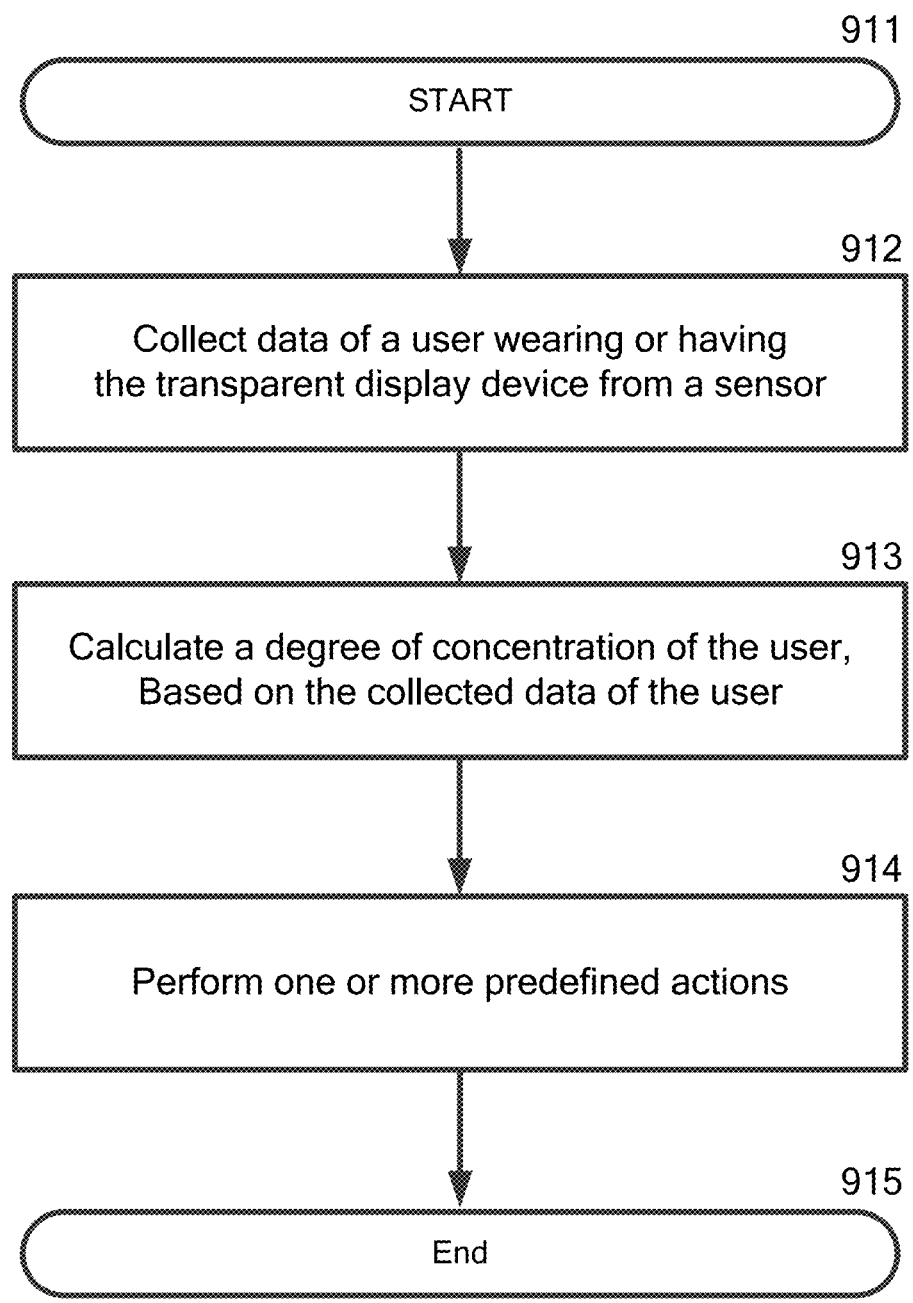
FIG. 9B illustrates an embodiment of a flowchart of a process for performing a predefined action, according to one embodiment of the present invention.

With reference now to FIG. 9B, FIG. 9B illustrates an embodiment of a flowchart of a process for performing a predefined action.

In step 911, the system starts the process mentioned above.

In step 912, the system collects data of a user wearing or having a transparent display device from a sensor, such as any sensor known in the art for measuring concentration. Alternatively, the system collects data of the user by analyzing video data which records a user behavior or facial expression. An example of obtaining concentration of a user is mentioned above.

In step 913, the system calculates a degree of concentration of the user, based on the collected data of the user.

In step 914, the system may perform one or more predefine actions, such as mentioned below:

(a1) displaying or not displaying an AR object, based on the degree of concentration; for example, the system may decide to display an AR object if the degree of concentration of the user is lower, or smaller than a predefined threshold, while the system may decide not to display an AR object if the degree of concentration of the user is higher, or larger than or equal to a predefined threshold, or the system may select or restrict a layer(s) to be displayed on the transparent display device, according to the degree of concentration of the user, and/or (a2) changing a displaying size of an AR object, based on the degree of concentration; for example, the system may decrease a display size of an AR object if the degree of concentration of the user is lower, or smaller than a predefined threshold, while the system may enlarge a display size of an AR object if the degree of concentration of the user is higher, or larger than or equal to a predefined threshold, and/or (a3) changing a displaying location of an AR object, based on the degree of concentration; for example, the system may display an AR object near or around a center of the screen on the transparent display device if the degree of concentration of the user is lower, or smaller than a predefined threshold, while the system may display an AR object near or around a corner of the screen on the transparent display device if the degree of concentration of the user is higher, or larger than or equal to a predefined threshold, and/or (a4) changing an AR content of an AR object, based on the degree of concentration; for example, the system may change an AR content of an AR object relating an advertisement if the degree of concentration of the user is lower, or smaller than a predefined threshold, while the system may change an AR content of an AR object relating a matter in which the user is now concentrated if the degree of concentration of the user is higher, or larger than or equal to a predefined threshold, and/or (a5) changing the number of an AR objects to be displayed, based on the degree of concentration; for example, the system may increase the number of AR objects displayed on the screen of the transparent display device if the degree of concentration of the user is lower, or smaller than a predefined threshold, while the system may reduce the number of AR objects displayed on the screen of the transparent display device if the degree of concentration of the user is higher, or larger than or equal to a predefined threshold; and/or (a6) changing a speed of playing an AR object, based on the degree of concentration; for example, the system may change a speed of playing an AR object quickly if the degree of concentration of the user is lower, or smaller than a predefined threshold, while the system may change a speed of playing an AR object slowly if the degree of concentration of the user is higher, or larger than or equal to a predefined threshold, and/or (a7) changing a frequency of switching an AR objects, based on the degree of concentration; for example, the system may change a frequency of switching an AR objects quickly if the degree of concentration of the user is lower, or smaller than a predefined threshold, while the system may change a frequency of switching an AR objects slowly if the degree of concentration of the user is higher, or larger than or equal to a predefined threshold, and/or (a8) adjusting sound volume associated with an AR object, based on the degree of concentration; for example, the system may increase sound volume if the degree of concentration of the user is lower, or smaller than a predefined threshold, while the system may decrease sound volume if the degree of concentration of the user is higher, or larger than or equal to a predefined threshold.

In step 915, the system terminates the process mentioned above.

Figure 9C:
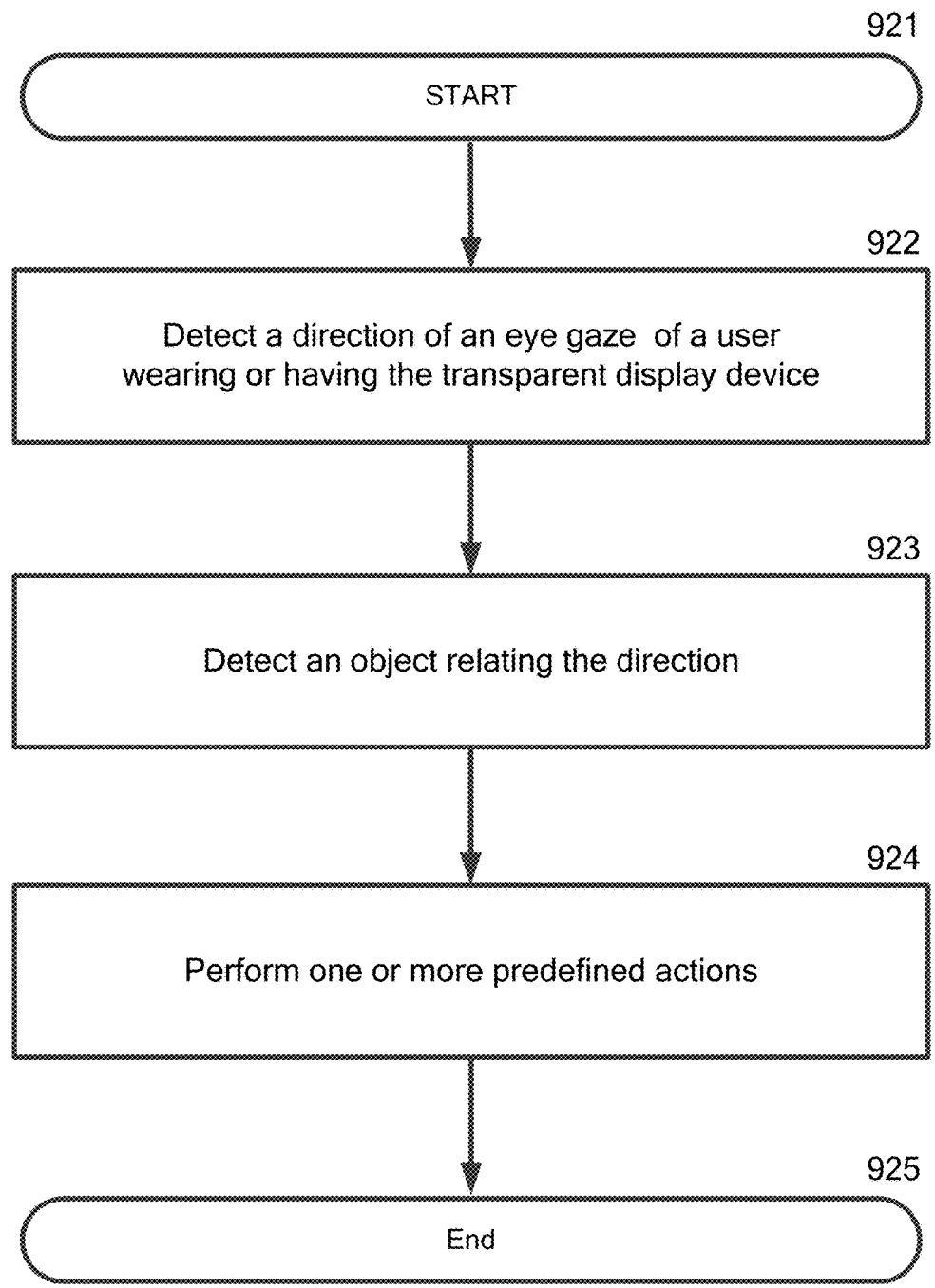
FIG. 9C illustrates an embodiment of a flowchart of a process for performing a predefined action, according to one embodiment of the present invention.

With reference now to FIG. 9C, FIG. 9C illustrates an embodiment of a flowchart of a process for performing a predefined action.

In step 921, the system starts the process mentioned above.

In step 922, the system detects a direction of an eye gaze of the user wearing or having the transparent display device.

In step 923, the system may detect an object, such as an AR object or real object, relating the detected direction.

In step 924, the system may perform one or more predefine actions, such as mentioned below:

(b1) displaying or not displaying an AR object, based on the direction of the eye gaze; for example, the system may decide to display an AR object if the AR object relates to the detected object, while the system may decide not to display an AR object if the AR object does not relate to the detected object, or the system may select or restrict a layer(s) to be displayed on the transparent display device, according to the detected object, and/or (b2) changing a displaying size of an AR object, based on the direction of the eye gaze; for example, the system may decrease a display size of an AR object if the AR object doe not relate to the detected object, while the system may enlarge a display size of an AR object if the AR object relates the detected object, and/or (b3) changing a displaying location of an AR object, based on the direction of the eye gaze; for example, the system may display an AR object near or around a center of the screen on the transparent display device if the AR object relates to the detected object, while the system may display an AR object near or around a corner of the screen on the transparent display device if the AR object does not relate to the detected object, and/or (b4) changing an AR content of an AR object, based on the direction of the eye gaze; for example, the system may change an AR content of an AR object relating the detected object, and/or (b5) changing the number of an AR objects to be displayed, based on the direction of the eye gaze; for example, the system may increase the number of AR objects displayed on the screen of the transparent display device if the AR object relates to the detected object, while the system may reduce the number of AR objects displayed on the screen of the transparent display device if the AR objects does not relate to the detected object, and/or (b6) changing a speed of playing an AR object, based on the direction of the eye gaze; for example, the system may change a speed of playing an AR object quickly if the AR object does not relate to the detected object, while the system may change a speed of playing an AR object slowly if the AR object related to the detected object, and/or (b7) changing a frequency of switching an AR objects, based on the direction of the eye gaze; for example, the system may change a frequency of switching an AR objects quickly if the AR object does not relate to the detected object, while the system may change a frequency of switching an AR objects slowly if the AR object related to the detected object, and/or (b8) adjusting sound volume associated with an AR object, based on the direction of the eye gaze; for example, the system may increase sound volume if the AR object related to relates to the detected object, while the system may decrease sound volume if the AR object does not relate to the detected object.

In step 925, the system terminates the process mentioned above.

Figure 9D:
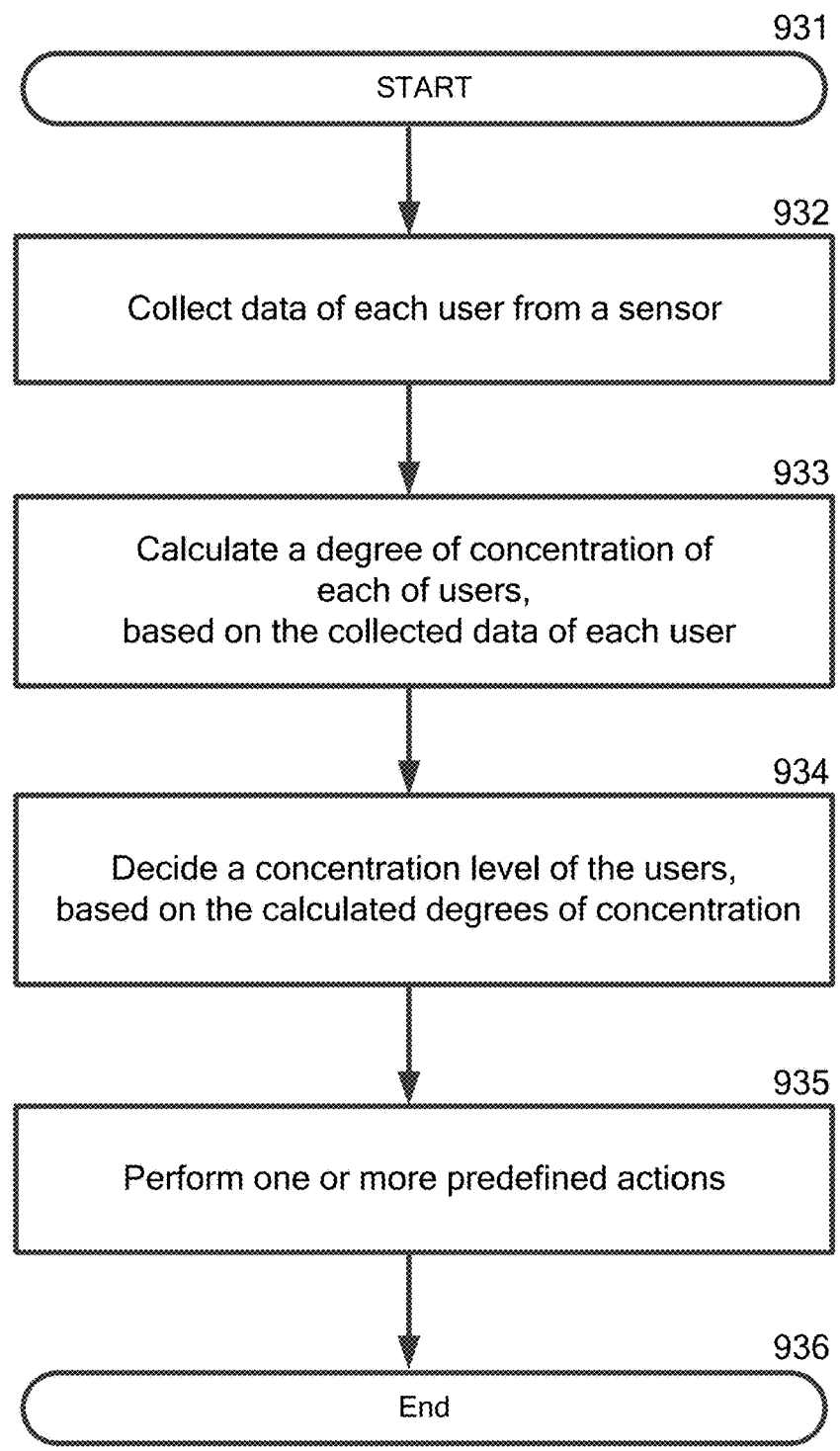
FIG. 9D illustrates an embodiment of a flowchart of a process for performing a predefined action, according to one embodiment of the present invention.

With reference now to FIG. 9D, FIG. 9D illustrates an embodiment of a flowchart of a process for performing a predefined action.

In step 931, the system starts the process mentioned above.

In step 932, the system collects data of each user from a sensor, such as any sensor known in the art for measuring concentration. Alternatively, the system collects data of each user by analyzing video data which records a user behavior or facial expression. An example of obtaining concentration of a user is mentioned above.

In step 932, the user is not limited to a user wearing or having a transparent display device and includes a user, for example, who is in the same area such as a stadium, a hall, a restaurant, a museum, a floor, or a room.

In step 933, the system calculates a degree of concentration of each user, based on the collected data of each user.

In step 934, the system decides a concentration level of the users, based on the calculated degrees of concentration.

In step 935, the system may perform one or more predefine actions, such as mentioned below:

(c1) displaying or not displaying an AR object, based on the degree of concentration; for example, the system may decide to display an AR object if the concentration level of the users is lower, or smaller than a predefined threshold, while the system may decide not to display an AR object if the concentration level of the users is higher, or larger than or equal to a predefined threshold, or the system may select or restrict a layer(s) to be displayed on the transparent display device, according to the concentration level of the users, and/or (c2) changing a displaying size of an AR object, based on the degree of concentration; for example, the system may decrease a display size of an AR object if the concentration level of the users is lower, or smaller than a predefined threshold, while the system may enlarge a display size of an AR object if the concentration level of the users is higher, or larger than or equal to a predefined threshold, and/or (c3) changing a displaying location of an AR object, based on the degree of concentration; for example, the system may display an AR object near or around a center of the screen on the transparent display device if the concentration level of the users is lower, or smaller than a predefined threshold, while the system may display an AR object near or around a corner of the screen on the transparent display device if the concentration level of the users is higher, or larger than or equal to a predefined threshold, and/or (c4) changing an AR content of an AR object, based on the degree of concentration; for example, the system may change an AR content of an AR object relating an advertisement if the concentration level of the users is lower, or smaller than a predefined threshold, while the system may change an AR content of an AR object relating a matter in which the user is now concentrated if the concentration level of the users is higher, or larger than or equal to a predefined threshold, and/or (c5) changing the number of an AR objects to be displayed, based on the degree of concentration; for example, the system may increase the number of AR objects displayed on the screen of the transparent display device if the concentration level of the users is lower, or smaller than a predefined threshold, while the system may reduce the number of AR objects displayed on the screen of the transparent display device if the concentration level of the users is higher, or larger than or equal to a predefined threshold; and/or (c6) changing a speed of playing an AR object, based on the degree of concentration; for example, the system may change a speed of playing an AR object quickly if the concentration level of the users is lower, or smaller than a predefined threshold, while the system may change a speed of playing an AR object slowly if the concentration level of the users is higher, or larger than or equal to a predefined threshold, and/or (c7) changing a frequency of switching an AR objects, based on the degree of concentration; for example, the system may change a frequency of switching an AR objects quickly if the concentration level of the users is lower, or smaller than a predefined threshold, while the system may change a frequency of switching an AR objects slowly if the concentration level of the users is higher, or larger than or equal to a predefined threshold, and/or (c8) adjusting sound volume associated with an AR object, based on the degree of concentration; for example, the system may increase sound volume if the concentration level of the users is lower, or smaller than a predefined threshold, while the system may decrease sound volume if the concentration level of the users is higher, or larger than or equal to a predefined threshold.

In step 936, the system terminates the process mentioned above.

Figure 9E:
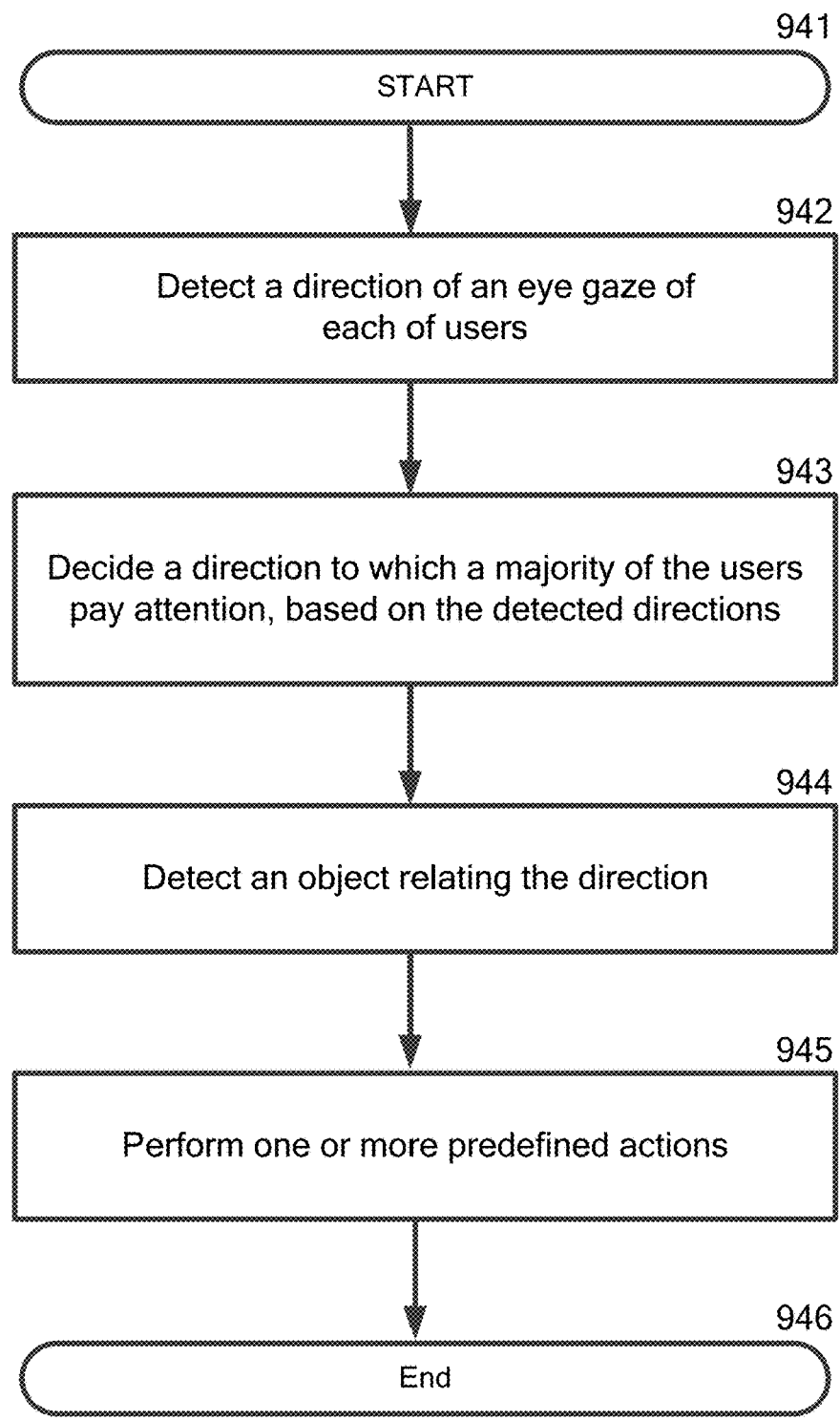
FIG. 9E illustrates an embodiment of a flowchart of a process for performing a predefined action, according to one embodiment of the present invention.

With reference now to FIG. 9E, FIG. 9E illustrates an embodiment of a flowchart of a process for performing a predefined action.

In step 941, the system starts the process mentioned above.

In step 942, the system detects a direction of an eye gaze of each user. If the user wears a transparent display device, the direction of an eye gaze of a user can be obtained from an eye-tracking sensor or video camera equipped with a transparent display device. If the user does not wear a equipped with a transparent display device, the direction of an eye gaze of a user can be obtained from an eye-tracking sensor or a video camera equipped with, for example, but not limited to, a ceiling or pole.

In step 942, the user is not limited to a user wearing or having a transparent display device and includes a user, for example, who is in the same area such as a stadium, a hall, a restaurant, a museum, a floor, or a room.

In step 943, the system may decide a direction to which a majority of the users pay attention, based on the detected directions. The system may use, for example, a frequency distribution of the direction in order to decide the direction.

In step 944, the system may detect an object, such as an AR object or real object, relating the detected direction.

In step 945, the system may perform one or more predefine actions, such as mentioned below:

(d1) displaying or not displaying an AR object, based on the direction of the eye gaze; for example, the system may decide to display an AR object if the AR object relates to the detected object, while the system may decide not to display an AR object if the AR object does not relate to the detected object, or the system may select or restrict a layer(s) to be displayed on the transparent display device, according to the detected object, and/or (d2) changing a displaying size of an AR object, based on the direction of the eye gaze; for example, the system may decrease a display size of an AR object if the AR object doe not relate to the detected object, while the system may enlarge a display size of an AR object if the AR object relates the detected object, and/or (d3) changing a displaying location of an AR object, based on the direction of the eye gaze; for example, the system may display an AR object near or around a center of the screen on the transparent display device if the AR object relates to the detected object, while the system may display an AR object near or around a corner of the screen on the transparent display device if the AR object does not relate to the detected object, and/or (d4) changing an AR content of an AR object, based on the direction of the eye gaze; for example, the system may change an AR content of an AR object relating the detected object, and/or (d5) changing the number of an AR objects to be displayed, based on the direction of the eye gaze; for example, the system may increase the number of AR objects displayed on the screen of the transparent display device if the AR object relates to the detected object, while the system may reduce the number of AR objects displayed on the screen of the transparent display device if the AR objects does not relate to the detected object, and/or (d6) changing a speed of playing an AR object, based on the direction of the eye gaze; for example, the system may change a speed of playing an AR object quickly if the AR object does not relate to the detected object, while the system may change a speed of playing an AR object slowly if the AR object related to the detected object, and/or (d7) changing a frequency of switching an AR objects, based on the direction of the eye gaze; for example, the system may change a frequency of switching an AR objects quickly if the AR object does not relate to the detected object, while the system may change a frequency of switching an AR objects slowly if the AR object related to the detected object, and/or (d8) adjusting sound volume associated with an AR object, based on the direction of the eye gaze; for example, the system may increase sound volume if the AR object related to relates to the detected object, while the system may decrease sound volume if the AR object does not relate to the detected object.

In step 946, the system terminates the process mentioned above.

Figure 10:
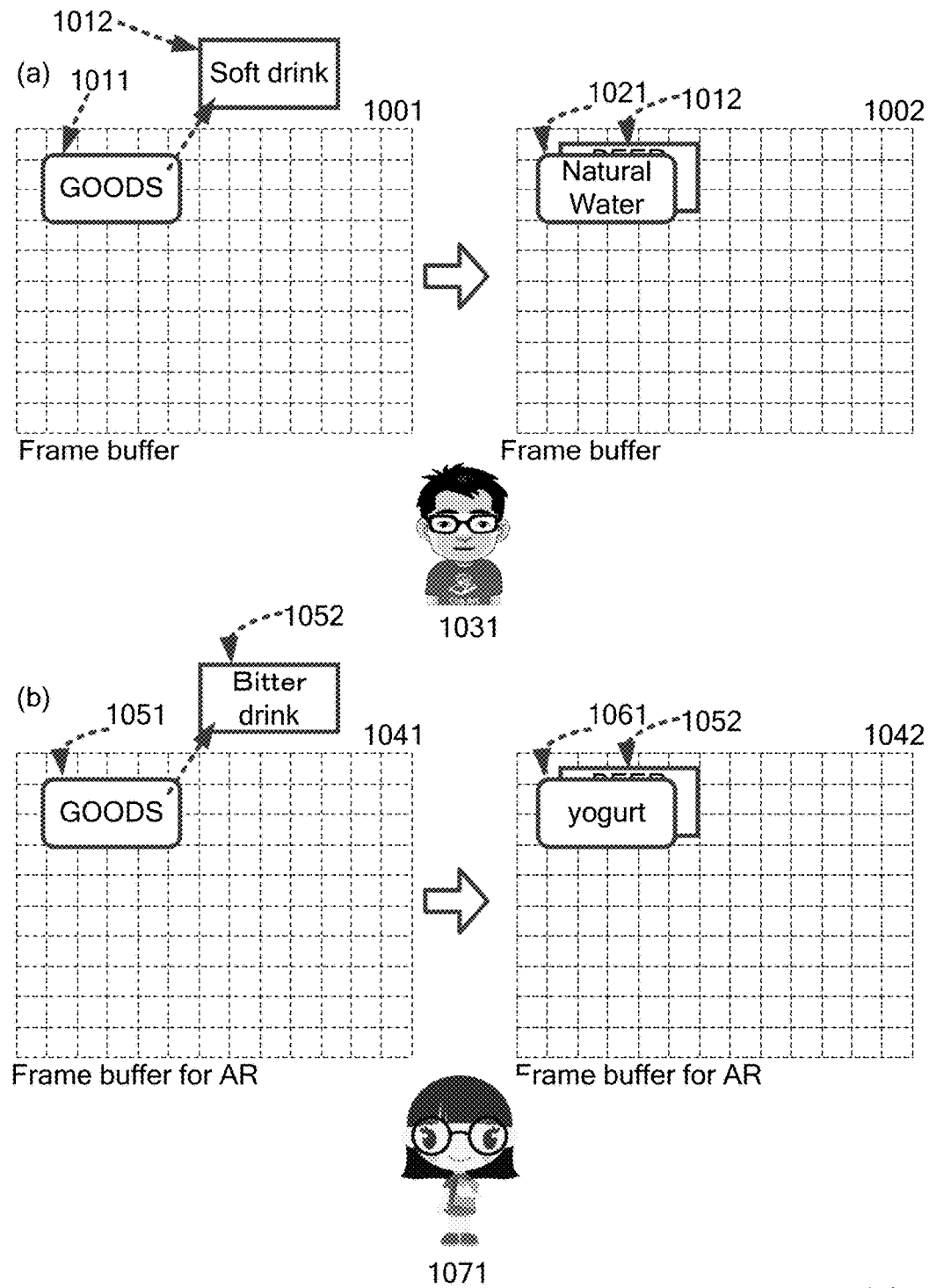
FIG. 10 illustrates an embodiment of overlapping an AR object with transparent areas where a real object can be seen, according to one embodiment of the present invention.

With reference now to FIG. 10, FIG. 10 illustrates an embodiment of overlapping an AR object with transparent areas where a real object can be seen.

The upper case (a) describes that an AR content of the AR object is replaced with an AR content according to a preference of a user.

The present frame buffer is shown as the frame buffer (1001). The AR object (1011) was already drawn, as seen in the frame buffer (1001).

Let us suppose that the AR object (1011) relates to an advertisement for sporting goods. A user (1031) who is 30 years old is now wearing a transparent display device.

The user is now moving his head, and the real object (1012) which is an advertisement signboard of a soft drink will be approaching in a range of a screen of the transparent display device. The system knows that a preference of the user is a natural water product. Accordingly, the system changes the AR content of the AR object (1011) from sporting goods to a natural water product. Further, the system draws the AR object (1011, now 1021) so as to partially or wholly overlap with the transparent area (1021) corresponding to the real object, namely the advertisement signboard of the soft drink, according to an embodiment of the present invention.

As a result, the user (1031) can see the AR object of an advertisement of the natural water product through the transparent display device, instead of the advertisement signboard of the soft drink.

Accordingly, the beverage company can promote the natural water product for a user whose characteristic is a natural water product.

The upper case (b) describes that an AR content of the AR object is replaced with an AR content according to an age of a user.

The present frame buffer is shown as the frame buffer (1041). The AR object (1051) was already drawn, as seen in the frame buffer (1041).

Let us suppose that the AR object (1041) relates to an advertisement for sporting goods. A user (1071) who is 8 years old is now wearing a transparent display device.

The user is now moving his head, and the real object (1052) which is an advertisement signboard of a bitter drink will be approaching in a range of a screen of the transparent display device. The system knows that an age of the user is 8 years old and a preference of the user is a yogurt. Accordingly, the system changes the AR content of the AR object (1051) from sporting goods to a yogurt product. Further, the system draws the AR object (1051, now 1051) so as to partially or wholly overlap with the transparent area (1051) corresponding to the real object, namely the advertisement signboard of the bitter drink, according to an embodiment of the present invention in order to hide the advertisement of the bitter drink.

As a result, the user (1071) can see the AR object of an advertisement of the yogurt product through the transparent display device, instead of the advertisement signboard of the bitter drink.

Accordingly, the beverage company can promote the yogurt product for a user whose age is younger.

Figure 11:
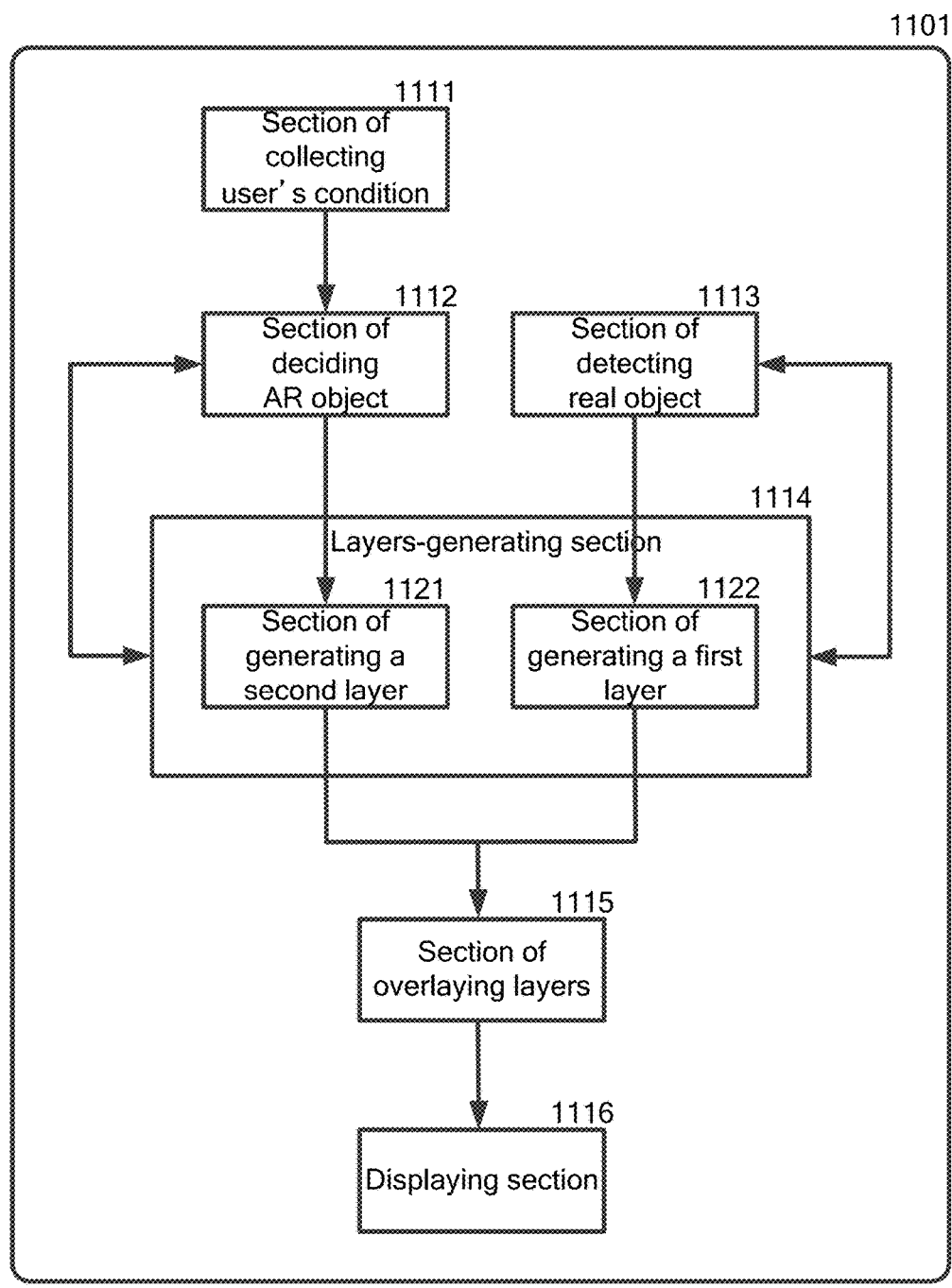
FIG. 11 illustrates an embodiment of an overall functional block diagram of a computer system hardware used in accordance with the embodiment of the flowcharts described in FIGS. 3B, 4B, 7B and 7C, 9A to 9E.

With reference now to FIG. 11, FIG. 11 illustrates an embodiment of an overall functional block diagram of a computer system hardware used in accordance with the embodiment of the flowcharts described in FIGS. 3B, 4B, 7B and 7C, 9A to 9E.

The system (1101) may correspond to the computer (101) described in FIG. 1.

The system (401) comprises a section of collecting user's condition (1111), a section of deciding AR object (1112), a section of detecting real object (1113), a layers-generating section (1114), a section of overlaying layers (1115) and a displaying section (1116).

The section of collecting user's condition (1111) may decide a degree of concentration of the user wearing or having the transparent display device, detect a direction of an eye gaze of the user wearing or having the transparent display device, decide a degree of concentration of each of a plurality of users and deciding a concentration level of the users, based on the decided degrees of concentration, or detect a direction of an eye gaze of each of a plurality of users and, then, deciding a direction to which a majority of the users pay attention, based on the detected directions.

The section of collecting user's condition (1111) may perform step 902 of FIG. 9A, steps 912 and 913 of FIG. 9B, steps 922 and 923 of FIG. 9C, steps 932 to 934 of FIG. 9D and step 942 to 944 of FIG. 9E.

The section of deciding AR object (1112) may perform step 345 of FIG. 3B, step 903 of FIG. 9A, step 914 of FIG. 9B, step 924 of FIG. 9C, step 935 of FIG. 9D and step 945 of FIG. 9E.

The section of detecting real object (1113) may perform step 342 of FIG. 3B.

The layers-generating section (1114) may comprise a section of generating a second layer (1121) and a section of generating a first layer (1122).

The layers-generating section (1114) may prepare a frame buffer and a priority buffer.

The layers-generating section (1114) may perform steps 442 to 448 of FIG. 4B, steps 741 to 748 of FIG. 7B and steps 762 to 766 of FIG. 7C.

The section of generating a second layer (1121) may associate one or more AR objects with a second layer for displaying one or more AR objects on the transparent display device.

The section of generating a second layer (1121) may perform steps 346 and 347 of FIG. 3B.

The section of generating a first layer (1122) may associate data of one or more transparent areas corresponding to one or more real objects with a first layer for seeing one or more real objects on the transparent display device.

The section of generating a first layer (1122) may perform steps 343 and 344 of FIG. 3B.

The section of overlaying layers (1115) may overlay the first layer with the second layer to display the one or more AR objects on the transparent display device.

The section of overlaying layers (1115) may perform steps 348 and 349 of FIG. 3B.

The displaying section (1116) may display the AR content(s), according to the overlapped layers.

Figure 12:
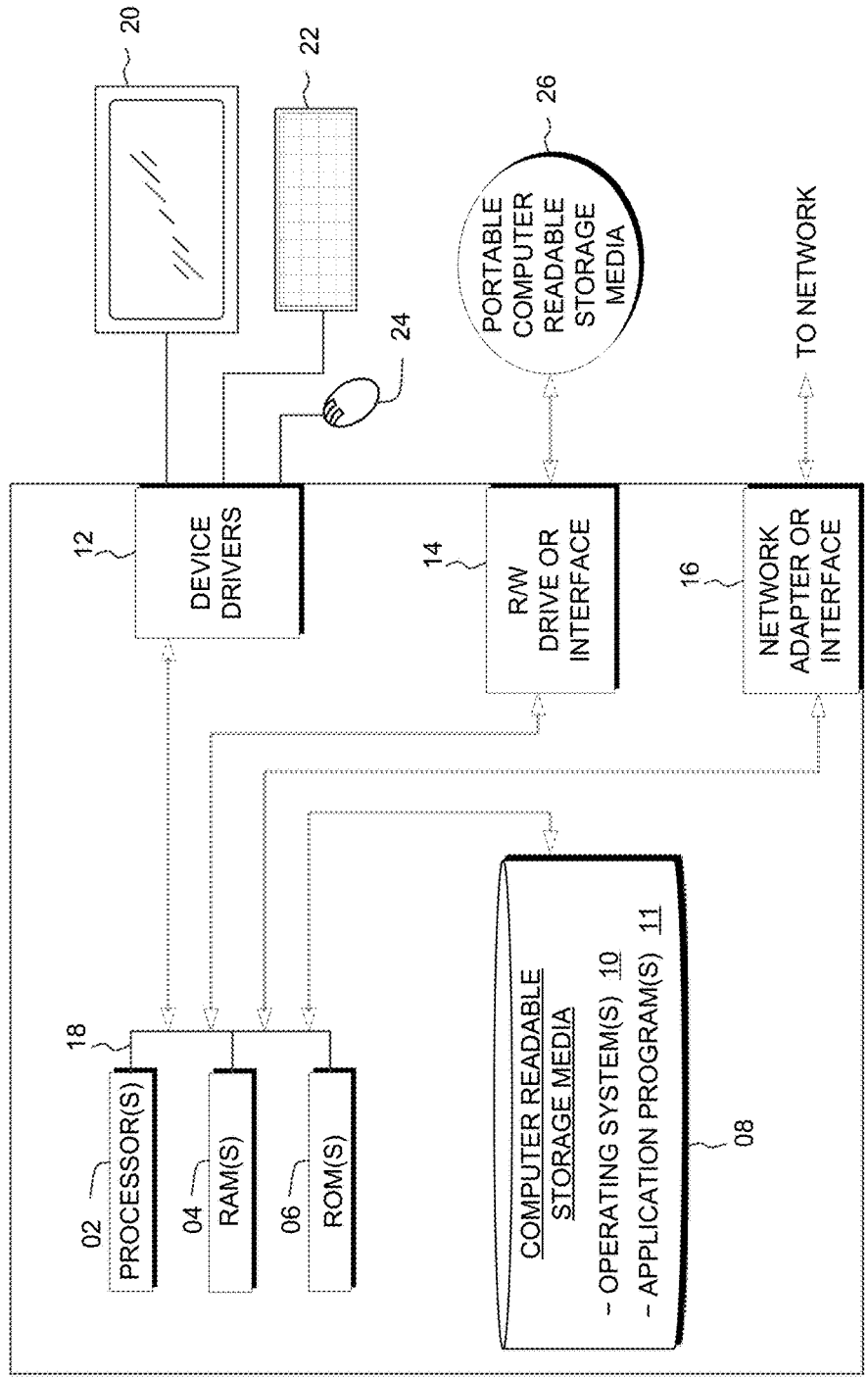
FIG. 12 is a block diagram depicting the hardware components of the system of FIG. 1, in accordance with an embodiment of the invention.

FIG. 12 depicts a block diagram of components of computer 101 in FIG. 1, in accordance with an embodiment of the present invention. It should be appreciated that FIG. 12 provides only an illustration of one implementation and does not imply any limitations with regard to the environments in which different embodiments may be implemented. Many modifications to the depicted environment may be made.

Computer 101 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example, the computer program of an embodiment of the present invention, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computer 101 may also include a R/W drive or interface 14 to read from and write to one or more portable computer readable storage media 26. Application programs 11 on computer 101 may be stored on one or more of the portable computer readable storage media 26, read via the respective R/W drive or interface 14 and loaded into the respective computer readable storage media 08.

Computer 101 may also include a network adapter or interface 16, such as a TCP/IP adapter card or wireless communication adapter (such as a 4G wireless communication adapter using OFDMA technology). Application programs 11 on computer 101 may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computer 101 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for displaying one or more augmented reality (AR) objects on a transparent display device, the method comprising:
    associating data of one or more transparent areas corresponding to one or more real objects with a first layer;
    associating one or more AR objects with a second layer;
    determining a concentration level of one or more users as it relates to at least one AR object of the one or more AR objects;
    based on determining that the concentration level does not exceed a threshold, increasing a playback speed associated with the at least one AR object;
    based on determining that determining that the concentration level exceeds a threshold, decreasing a playback speed associated with the at least one AR object; and
    overlaying the first layer with the second layer to display the one or more AR objects on a transparent display device based on a priority, wherein the one or more real objects are seen through the one or more transparent areas on the transparent display device by a user utilizing the transparent display device.

2. The method according to claim 1, the method further comprising:
    preparing a drawing area in a priority buffer, wherein the drawing area corresponds to a display area on the transparent display device, and wherein each priority associated with each object of the one or more real objects and the one or more AR objects is given to the drawing area further based on information on a location and a shape of the object;
    selecting one object having a highest priority among the one or more real objects and the one or more AR objects;
    determining whether the location and shape of the selected object overlaps with a part of the drawing area to which a priority was already given;
    based on determining that the location and shape of the selected object overlaps with a part of the drawing area to which a priority was already given; determining whether the selected object is an AR object;
    based on determining that the selected object is an AR object, displaying the selected object on the transparent display device; and
    based on determining that the selected object is not an AR object, the selected object is seen through the transparent area corresponding to the selected object on the transparent display device by the user.

3. The method according to claim 2, the method further comprising:
    based on determining that the location and shape of the selected object does not overlap with a part of the drawing area to which a priority was already given, giving to the drawing area a priority associated with the selected object so as to correspond to the location and shape corresponding to the selected object;
    determining whether the selected object is an AR object;
    based on determining that the selected object is an AR object, displaying the selected object on the transparent display device; and
    based on determining that the selected object is not an AR object, the selected object is seen through the transparent area corresponding to the selected object on the transparent display device utilized by the user.

4. The method according to claim 2, the method further comprising:
    based on determining that the location and shape of the selected object overlaps with a part of the drawing area to which a priority was already given, determining whether the priority associated with the selected object is lower than the priority which was already given to the priority buffer;
    based on determining that the priority associated with the selected object is lower than the priority which was already given to the priority buffer, not displaying the selected object on the transparent display device.

5. The method according to claim 2, the method further comprising:
    based on determining that the location and shape of the selected object overlaps with a part of the drawing area to which a priority was already given, determining whether the priority associated with the selected object is the same as the priority which was already given to the drawing area;
    based on determining that the priority associated with the selected object is the same as the priority which was already given to the drawings area, determining whether the selected object is an AR object;
    based on determining that the selected object is an AR object, determining whether an object associated with the priority which was already given to the drawing area is a real object; and
    based on determining that an object associated with the priority which was already given to the drawing area is a real object, displaying the AR object on the transparent area corresponding to the real object.

6. The method according to claim 2, the method further comprising:
    based on determining that the location and shape of the selected object overlaps with a part of the drawing area to which a priority was already given, determining whether the priority associated with the selected object is the same as the priority which was already given to the drawing area;
    based on determining that the priority associated with the selected object is the same as the priority which was already given to the drawing area, determining whether a content type of the selected object is the same as a content type of an object associated with the priority which was already given to the drawing area; and
    based on determining that a content type of the selected object is the same as a content type of an object associated with the priority which was already given to the drawing area, displaying the selected object on the object associated with the priority which was already given to the drawing area.

7. The method according to claim 1, the method further comprising:
    selecting an AR content of at least one AR object of the one or more AR objects, based on at least one characteristic of the user before the association of the data with the first layer.

8. The method according to claim 1, wherein determining the priority for each object of the one or more real objects and the one or more AR objects is further based on:
    determining a degree of concentration of the user utilizing the transparent display device;
    determining a degree of concentration of each of a plurality of users; and based on the degree of concentration of the user and each of the plurality of users, deciding a concentration level of the user and the users.

9. The method according to claim 8, wherein determining the priority for each object of the one or more real objects and the one or more AR objects is further based on at least one of:
   detecting a direction of an eye gaze of the user utilizing the transparent display device.

10. The method according to claim 9, the method further comprising:
   before the association of the data with the first layer and based on the priority for each object of the one or more real objects and the one or more AR objects, performing at least one of:
      determining whether to display the AR object;
      changing a display size of the AR object;
      changing a displaying location of the AR object;
      changing an AR content of the AR object;
      changing the number of the AR objects to be displayed;
      changing a speed of playing the AR object; and
      changing a frequency of switching the AR objects.

11. The method according to claim 1, the method further comprising:
   determining whether a display location of at least one of: a first AR object and first transparent area is approaching a display location on the transparent display device of at least one of: a second AR object and second transparent area; and
   based on determining that a display location of at least one of: a first AR object and first transparent area is approaching a display location on the transparent display device of at least one of: a second AR object and second transparent area, changing an AR content of at least one of the first and second AR objects.

12. The method according to claim 11, wherein the determination is performed by identifying an overlapping of a transparent region adjacent to at least one of: the first AR object and first transparent area with a transparent region adjacent to at least one of: the second AR object or second transparent area.

13. The method according to claim 1, the method further comprising:
   determining whether a display location of an AR object is approaching a displaying location of a real object on the transparent display device; and
   based on determining that a display location of an AR object is approaching a displaying location of a real objects on the transparent display device, replacing an AR content of the AR object with an AR content associated with the real object.

14. The method according to claim 13, wherein the determination is performed by identifying an overlapping of a transparent region adjacent to the AR object with a transparent region adjacent to the real object.

15. The method according to claim 13, the method further comprising:
   displaying the AR content after the replacement on a transparent area corresponding to the real object.

16. The method according to claim 13, the method further comprising:
   displaying the AR content after the replacement so that a displaying area of the AR content after the change does not overlap with a transparent area corresponding to the real object.

17. The method of claim 8, wherein determining a degree of concentration of the user utilizing the transparent display device further comprises:
   recording a video of the user; and
   analyzing facial expressions of the user.

* * * * *